United States Patent
Vikberg et al.

(10) Patent No.: US 10,638,391 B2
(45) Date of Patent: Apr. 28, 2020

(54) METHOD AND APPARATUS FOR CONTROLLING SELECTION OF THE SOLUTION FOR WLAN AND UNLICENSED SPECTRUM USAGE

(71) Applicant: Telefonaktiebolaget L M Ericsson (publ), Stockholm (SE)

(72) Inventors: Jari Vikberg, Järna (SE); Icaro Leonardo J. Da Silva, Bromma (SE); Filip Mestanov, Sollentuna (SE); Oumer Teyeb, Solna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 849 days.

(21) Appl. No.: 14/930,189

(22) Filed: Nov. 2, 2015

(65) Prior Publication Data
US 2017/0127325 A1    May 4, 2017

(51) Int. Cl.
*H04W 36/14*    (2009.01)
*H04W 48/18*    (2009.01)
(Continued)

(52) U.S. Cl.
CPC .......... *H04W 36/14* (2013.01); *H04L 5/0035* (2013.01); *H04W 16/14* (2013.01); *H04W 48/08* (2013.01);
(Continued)

(58) Field of Classification Search
CPC ... H04W 36/14; H04W 16/14; H04W 84/042; H04W 84/12; H04W 88/06; H04L 5/0035
See application file for complete search history.

(56) References Cited

U.S. PATENT DOCUMENTS

2010/0267388 A1*  10/2010  Olsson .................. H04W 36/38
                                                                         455/436
2013/0016696 A1*  1/2013  Adjakple .......... H04W 28/0252
                                                                         370/331
(Continued)

FOREIGN PATENT DOCUMENTS

GB          2509936 A      7/2014
WO    2014177208 A1    11/2014
(Continued)

OTHER PUBLICATIONS

Qimei Cui et al., "A Unified Protocol Stack Solution for LTE and WLAN in Future Mobile COnverged Networks", Dec. 2014, IEEE, p. 24-33.*
(Continued)

*Primary Examiner* — Alpus Hsu
*Assistant Examiner* — Camquyen Thai
(74) *Attorney, Agent, or Firm* — Patent Portfolio Builders, PLLC

(57) ABSTRACT

Embodiments of systems and methods relating to a cellular communications network and Wireless Local Area Network (WLAN) integration/aggregation are disclosed. In some embodiments, a method of operation of a base station of a cellular communications network comprises obtaining one or more Allowed Wireless Local Area Network/Unlicensed Band Solution (AWUBS) indications from a core network of the cellular communications network. The one or more AWUBS indications are indicative of one or more AWUBSs allowed for a particular User Equipment (UE). The method further comprises using one of the one or more AWUBSs with respect to the UE. In this manner, the base station is enabled to obtain an indication(s) of the AWUBS(s) allowed for the UE and then use only an allowed AWUBS for that UE.

21 Claims, 14 Drawing Sheets

(51) Int. Cl.
- *H04W 48/08* (2009.01)
- *H04L 5/00* (2006.01)
- *H04W 16/14* (2009.01)
- *H04W 84/04* (2009.01)
- *H04W 84/12* (2009.01)
- *H04W 88/06* (2009.01)

(52) U.S. Cl.
CPC .......... *H04W 48/18* (2013.01); *H04W 84/042* (2013.01); *H04W 84/12* (2013.01); *H04W 88/06* (2013.01)

(56) References Cited

U.S. PATENT DOCUMENTS

| | | | | |
|---|---|---|---|---|
| 2014/0092731 | A1* | 4/2014 | Gupta | H04W 4/70 370/229 |
| 2014/0233386 | A1* | 8/2014 | Jamadagni | H04W 36/22 370/235 |
| 2014/0369201 | A1* | 12/2014 | Gupta | H04W 4/70 370/235 |
| 2016/0073297 | A1* | 3/2016 | Hwang | H04W 36/0011 370/331 |
| 2016/0182204 | A1* | 6/2016 | Hsieh | H04L 5/0055 370/329 |
| 2016/0227440 | A1* | 8/2016 | Forssell | H04W 28/08 |
| 2016/0323779 | A1* | 11/2016 | Laselva | H04W 28/08 |
| 2016/0345334 | A1* | 11/2016 | Veerepalli | H04W 72/0493 |

FOREIGN PATENT DOCUMENTS

| | | | | |
|---|---|---|---|---|
| WO | WO-2015105383 | A1 * | 7/2015 | ............ H04W 48/08 |
| WO | 2015152787 | A1 | 10/2015 | |

OTHER PUBLICATIONS

Author Unknown, "Technical Specification Group Radio Access Network; Study on Multiple Radio Access Technology (Multi-RAT) joint coordination (Release 13)," Technical Report 37.870, Version 13.0.0, 3GPP Organizational Partners, Jun. 2015, 24 pages.

Author Unknown, "Technical Specification Group Radio Access Network; Evolved Universal Terrestrial Radio Access (E-UTRA); User Equipment (UE) procedures in idle mode (Release 12)," Technical Specification 36.304, Version 12.0.0, 3GPP Organizational Partners, Mar. 2014, 34 pages.

Author Unknown, "Technical Specification Group Radio Access Network; Evolved Universal Terrestrial Radio Access (E-UTRA); Radio Resource Control (RRC); Protocol specification (Release 12)," Technical Specification 36.331, Version 12.1.0, 3GPP Organizational Partners, Mar. 2014, 356 pages.

CMCC (rapporteur), "R3-141512: Way forward on Multi-RAT Joint coordination," 3rd Generation Partnership Project (3GPP), TSG-RAN3 Meeting #84, May 19-23, 2014, 3 pages, Seoul, Korea.

Intel Corporation, et al., "RP-150510: New WI Proposal: LTE-WLAN Radio Level Integration and Interworking Enhancement," 3rd Generation Partnership Project (3GPP), TSG RAN Meeting #67, Mar. 9-12, 2015, 9 pages, Shanghai, China.

International Search Report and Written Opinion for International Patent Application No. PCT/IB2015/058562, dated Jun. 8, 2016, 23 pages.

\* cited by examiner

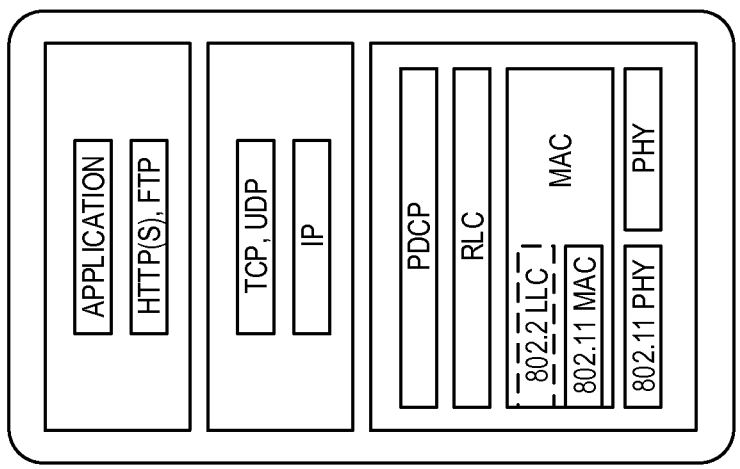
FIG. 1C  MAC AGGREGATION
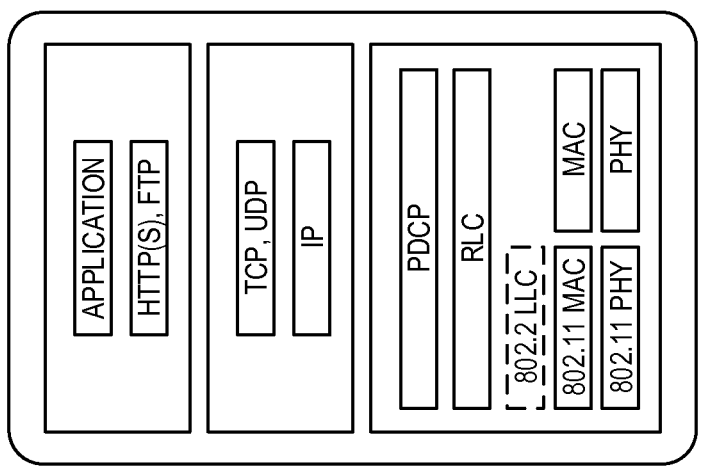
FIG. 1B  RLC AGGREGATION
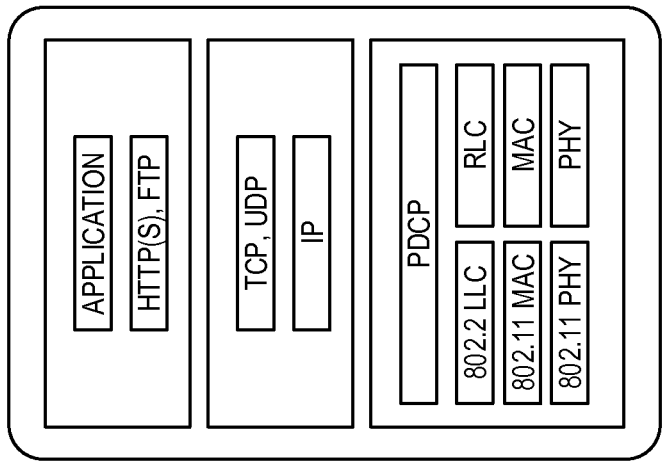
FIG. 1A  PDCP AGGREGATION

METHOD AND APPARATUS FOR CONTROLLING SELECTION OF THE SOLUTION FOR WLAN AND UNLICENSED SPECTRUM USAGE

TECHNICAL FIELD

The present disclosure relates to Third Generation Partnership Project (3GPP) and Wireless Local Area Network (WLAN) integration/aggregation/interworking.

BACKGROUND

Third Generation Partnership Project (3GPP)/Wireless Local Area Network (WLAN) Interworking Most current Wi-Fi/WLAN deployments are totally separate from mobile networks and can be seen as non-integrated from the terminal perspective. Most Operating Systems (OSs) for User Equipment devices (UEs) such as Android™ and iOS® devices, support a simple Wi-Fi offloading mechanism where a UE immediately switches all its Internet Protocol (IP) traffic to a Wi-Fi network upon detection of a suitable network with a received signal strength above a certain level. Notably, Wi-Fi and WLAN are herein used interchangeably. Henceforth, the decision to offload to a Wi-Fi network or not is referred to as access selection strategy and the term "Wi-Fi-if-coverage" is used to refer to the aforementioned strategy of selecting a Wi-Fi network whenever such a network is detected.

There are several drawbacks of the "Wi-Fi-if-coverage" strategy. A first drawback is that, although the user/UE can save previous pass codes for already accessed Wi-Fi Access Points (APs), hotspot login for previously non-accessed APs usually requires user intervention, either by entering the pass code in a Wi-Fi Connection Manager (CM) or using a web interface. The CM is software on a UE that is in charge of managing the network connections of the terminal, taking into account user preferences, operator preferences, network conditions, etc.

A second drawback is that no consideration of expected user experience is made except those considered in the UE implemented as a proprietary solution, and this can lead to a UE being handed over from a high data rate mobile network connection to a low data rate Wi-Fi connection. Even though the UE's OS or some high level software is smart enough to make the offload decisions only when a signal level on a Wi-Fi network is considerably better than a mobile network link, there can still be limitations on the backhaul of the Wi-Fi AP that may end up being a bottleneck.

A third drawback is that no consideration of the load conditions in the mobile network and the Wi-Fi network are made. As such, the UE might still be offloaded to a Wi-Fi AP that is serving several UEs while the mobile network (e.g., Long Term Evolution (LTE)) that it was previously connected to is rather unloaded.

A fourth drawback is that interruptions of on-going services can occur due to the change of IP address when the UE switches to the Wi-Fi network. For example, a user who started a Voice over IP (VoIP) call while connected to a mobile network is likely to experience a call drop when arriving home and the UE switching to the Wi-Fi network automatically. Though some applications are smart enough to handle this and survive the IP address change (e.g., Spotify®), the majority of current applications do not. This places a burden on application developers if they have to ensure service continuity.

A fifth drawback is that no consideration of the UE's mobility is made. Due to this, a fast moving UE can end up being offloaded to a Wi-Fi AP for a short duration, just to be handed over back to the mobile network. This is especially a problem in scenarios like restaurants and cafes with open Wi-Fi network, where a user walking by or even driving by the restaurant or cafe might be affected. Such ping pong between Wi-Fi and mobile networks can cause service interruptions as well as generate considerable unnecessary signaling (e.g., towards authentication servers).

Recently, Wi-Fi has been subject to increased interest from cellular network operators, and not only as an extension to fixed broadband access. The interest is mainly about using the Wi-Fi technology as an extension, or alternative, to cellular radio access network technologies to handle the always increasing wireless bandwidth demands. Cellular operators that are currently serving mobile users with, e.g., any of the 3GPP technologies (LTE, Universal Mobile Telecommunications System (UMTS)/Wideband Code Division Multiple Access (WCDMA), or Global System for Mobile Communications (GSM)) see Wi-Fi as a wireless technology that can provide good support in their regular cellular networks. The term "operator-controlled Wi-Fi" points to a Wi-Fi deployment that on some level is integrated with a cellular network operator's existing network and where 3GPP radio access networks and Wi-Fi wireless access may even be connected to the same core network and provide the same services.

There is currently quite intense activity in the area of operator-controlled Wi-Fi in several standardization organizations. In 3GPP, activities to connect Wi-Fi APs to the 3GPP-specified core network is pursued, and in Wi-Fi Alliance (WFA), activities related to certification of Wi-Fi products are undertaken, which to some extent also is driven from the need to make Wi-Fi a viable wireless technology for cellular operators to support high bandwidth offerings in their networks. The term "Wi-Fi offload" is commonly used and points towards cellular network operators seeking means to offload traffic from their cellular networks to Wi-Fi, e.g., in peak traffic hours and in situations when the cellular network for one reason or another needs to be off-loaded, e.g., to provide requested quality of service, maximize bandwidth, or simply for coverage.

Radio Access Network (RAN) Level Integration in Release 12 (Rel-12)

3GPP has specified a feature/mechanism for WLAN/3GPP radio interworking which improves operator control with respect to how a UE performs access selection and traffic steering between 3GPP and WLANs belonging to the operator or its partners. The mechanism may also be used for other, non-operator, WLANs as well, even though this is not the main target.

It is discussed that, for this mechanism, the RAN provides assistance parameters that helps the UE in access selection. RAN assistance information is composed of three main components; namely, threshold values, an Offloading Preference Indicator (OPI), and WLAN identifiers. The UE is also provided with RAN rules/policies that make use of these assistance parameters. The threshold values could be, for example, for metrics such as 3GPP signal related metrics, Reference Signal Received Power (RSRP)/Reference Signal Received Quality (RSRQ)/Received Signal Code Power (RSCP)/Energy per Chip/spectral Noise density (Ec/No), WLAN signal related metrics such as Received Channel Power Indicator (RCPI)/Received Signal Strength Indication (RSSI), WLAN load/utilization, WLAN backhaul load/capacity, etc. One example of a RAN rule that uses the threshold value could be that the UE should connect to a WLAN if the RSRP is below the signaled RSRP threshold at the same time as the WLAN RCPI is above the signaled RCPI threshold (it is also discussed that the RAN should provide thresholds for when the UE should steer traffic back from WLAN to 3GPP). The RAN rules/policies are expected to be specified in a 3GPP specification such as Technical Specification (TS) 36.304 V12.0.0 and/or TS 36.331 V12.1.0.

With the above mechanism, it is likely not wanted, or maybe not even feasible, that the UE considers any WLAN when deciding where to steer traffic. For example, it may not be feasible that the UE uses this mechanism to decide to steer traffic to a WLAN not belonging to the operator. Hence, it has been proposed that the RAN should also indicate to the UE for which WLANs the mechanism should be applied by sending WLAN identifiers.

The RAN may also provide additional parameters which are used in Access Network Discovery and Selection Function (ANDSF) policies. One proposed parameter is OPI. One possibility for OPI is that it is compared to a threshold in the ANDSF policy to trigger different actions. Another possibility is that OPI is used as a pointer to point to and select different parts of the ANDSF policy, which would then be used by the UE.

The RAN assistance parameters (i.e., thresholds, WLAN identifiers, OPI) provided by the RAN may be provided with dedicated signaling and/or broadcast signaling. Dedicated parameters can only be sent to the UE when having a valid Radio Resource Control (RRC) connection to the 3GPP RAN. A UE which has received dedicated parameters applies dedicated parameters; otherwise, the UE applies the broadcast parameters. If no RRC connection is established between the UE and the RAN, the UE cannot receive dedicated parameters.

In 3GPP, it has been agreed that ANDSF should be enhanced for Rel-12 to use the thresholds and OPI parameters that are communicated by the RAN to the UE. If enhanced ANDSF policies are provided to the UE, the UE will use the ANDSF policies instead of the RAN rules/policies (i.e., ANDSF has precedence).

Tight Integration/Aggregation between 3GPP and WLAN

Within the scope of 3GPP Release 13 (Rel-13), there has been a growing interest in realizing even tighter integration/aggregation between 3GPP and WLAN (e.g., integration/aggregation in the same way as carrier aggregation between multiple carriers in 3GPP, where the WLAN is used just as another carrier). Such an aggregation is expected to make it possible for a more optimal aggregation opportunity as compared to MultiPath Transmission Control Protocol (MPTCP), as the aggregation is performed at a lower layer (e.g., at a lower protocol layer) and as such the scheduling and flow control of the data on the WLAN and 3GPP links can be controlled by considering dynamic radio network conditions.

FIGS. 1A through 1C illustrate three different protocol options for tight integration/aggregation between 3GPP and WLAN at the Packet Data Convergence Protocol (PDCP), Radio Link Control (RLC), and Medium Access Control (MAC) levels, respectively. Note that other integration/aggregation schemes are also possible. For instance, one other example is to perform the aggregation/integration above the PDCP protocol layer. FIGS. 1A through 1C show the main principles for integration/aggregation at the PDCP level, the RLC level, and the MAC level, respectively, and additional functionality that may be needed. For example, in the PDCP level aggregation, an additional protocol layer may be used between the PDCP layer and the 802.2 Logical Link Control (LLC) layer to convey information about the UE and the radio bearer the traffic is associated with (this additional protocol layer is shown as "Glue 1" in FIGS. 2A and 2B).

Note that FIGS. 1A through 1C show the protocol stack at a UE. In the case of a standalone AP and enhanced or evolved Node B (eNB) (i.e., AP and eNB are not co-located), the protocol stack for supporting aggregation is a little bit different, as the LLC frames now have to be relayed towards the standalone eNB. FIG. 2A illustrates this for the case of PDCP level aggregation. In this case, once the LLC packet is decoded at the AP (in the uplink direction from the UE to the AP) and the AP realizes that this packet is a PDCP packet that has to be routed to an eNB, the forwarding can be performed, for example, via normal Transmission Control Protocol (TCP)/IP protocol stack. FIG. 2B shows PDCP level aggregation with a co-located/combined eNB and AP.

A study item entitled "Study on Multiple Radio Access Technology (Multi-RAT) joint coordination" has been finalized in 3GPP TSG RAN3 for 3GPP Release 13 (see 3GPP Technical Report (TR) 37.870 Release 13). The study item included investigation of potential enhancements of RAN interfaces and procedures to support the joint operation among different Radio Access Technologies (RATs), including WLAN. For the 3GPP-WLAN coordination part, it was agreed to focus on non-integrated 3GPP/WLAN nodes since integrated nodes are a matter of implementation. The study recommends the specification of an interface between Evolved Universal Terrestrial Radio Access Network (EU-TRAN) and WLAN, and an architecture including such an interface is shown in FIG. 3. The interface between the WLAN AP and the eNB is referred to as an Xw interface from here onwards.

When it comes to aggregation, the Xw interface can be used not only for forwarding the aggregated data, but also for control plane signaling regarding the aggregation. Note that for the case of co-located APs and eNBs, a proprietary interface could be employed for the provision of similar functionalities.

The control plane protocol architecture between the UE and the eNB (for the case of WLAN related control signaling) and also between the eNB and the WLAN AP are illustrated in FIGS. 4 and 5. As shown in FIG. 4, the eNB can configure the settings of some of the UE's WLAN parameters and behavior via RRC signaling. On the other hand, as shown in FIG. 5, the eNB uses the XwAP application protocol of the Xw interface to configure the WLAN AP.

Carrier Aggregation (CA) and Licensed Assisted Access (LAA)

The LTE Release 10 (Rel-10) specifications have been standardized, supporting Component Carrier (CC) bandwidths up to 20 Megahertz (MHz) (which is the maximum LTE Release 8 (Rel-8) carrier bandwidth). An LTE Rel-10 operation wider than 20 MHz is possible and appears as a number of LTE CCs to a LTE Rel-10 UE. The straightforward way to obtain bandwidths wider than 20 MHz is by means of CA. CA implies that an LTE Rel-10 UE can receive multiple CCs, where each CC has, or at least has the possibility to have, the same structure as a Rel-8 carrier. CA is illustrated in FIG. 6. The Rel-10 standard supports up to five aggregated CCs where each CC is limited in the Radio Frequency (RF) specifications to have a one of six bandwidths namely 6, 15, 25, 50, 75, or 100 Resource Blocks (RBs) (corresponding to 1.4, 3 5 10 15 and 20 MHz respectively).

The number of aggregated CCs as well as the bandwidth of the individual CCs may be different for uplink and downlink. A symmetric configuration refers to the case where the number of CCs in downlink and uplink is the same whereas an asymmetric configuration refers to the case that the number of CCs is different in downlink and uplink. It is important to note that the number of CCs configured in the network may be different from the number of CCs seen by a UE. A UE may, for example, support more downlink CCs than uplink CCs, even though the network offers the same number of uplink and downlink CCs.

CCs are also referred to as cells or serving cells. More specifically, in an LTE network, the cells aggregated by a UE are denoted Primary Serving Cell (PCell) and Secondary Serving Cells (SCells). The term "serving cell" comprises both PCell and SCells. All UEs have one PCell. The cell that is a UE's PCell is UE specific and is considered "more important," i.e. vital control signaling and other important signaling is typically handled via the PCell. Uplink control signaling is always sent on a UE's PCell. The CC configured as the PCell is the Primary CC (PCC), whereas all other CCs are SCells. The UE can send and receive data both on the PCell and the SCells. For control signaling such as scheduling commands, the control signaling can be configured to only be transmitted and received on the PCell but where the commands are also valid for the SCell, or the control signaling can be configured to be transmitted and received on both the PCell and the SCells. Regardless of the mode of operation, the UE will only need to read the broadcast channel in order to acquire system information parameters on the PCC. System information related to the Secondary Component Carriers (SCCs) may be provided to the UE in dedicated RRC messages.

During initial access, a LTE Rel-10 UE behaves similar to a LTE Rel-8 UE. However, upon successful connection to the network, a Rel-10 UE may—depending on its own capabilities and the network—be configured with additional serving cells in the uplink and downlink. Configuration is based on RRC. Due to the heavy signaling and rather slow speed of RRC signaling, it is envisioned that a UE may be configured with multiple serving cells even though not all of them are currently used.

Different deployment scenarios for CA in relation to frequency bands and the placement of cells within frequency bands is shown in FIG. 7. The different variants are i) intra-band aggregation, contiguous cells, ii) intra-band aggregation, non-contiguous cells and iii) inter-band aggregation. The different frequency bands are part of licensed spectrum.

To summarize, LTE CA supports efficient use of multiple carriers, allowing data to be sent/received over all carriers. There is support for cross-carrier scheduling avoiding the need for the UE to listen to all carrier-scheduling channels all the time. The solution relies on tight time synchronization between the carriers. The synchronization requirements impact the different deployment possibilities. It is possible to both have Intra-Digital Unit (Intra-DU) CA meaning that the PCell and all the SCell(s) are controlled by the same DU. Inter-DU CA, on the other hand, means that the PCell and SCell(s) may be controlled by different DUs.

LAA generally relates to applying LTE CA to the unlicensed spectrum. The main driver is the assumption of high availability of unlicensed spectrum globally and the use of this unlicensed spectrum for small cells. Unlicensed spectrum is used as a performance booster managed by a licensed carrier in LTE LAA. In relation to the above description about LTE CA, it can be described that the PCell is always in the licensed spectrum and that the SCell may use unlicensed bands (in addition to or without SCell(s) on licensed bands). LAA is shown in FIG. 8 and is a variant of inter-band aggregation (as shown in FIG. 7). LAA is also called LTE-LAA.

Subscriber Profile ID (SPID) for RAT/Frequency Priority

SPID is one mechanism for the core network to indicate UE-specific preferences to RAN. It is currently used, for example, for both active and idle mode mobility control of the UE.

SPID is assigned to specific subscriptions and stored in a Home Subscriber Server (HSS), as illustrated in FIG. 9. FIG. 9 more specifically illustrates SPID handling in different nodes of the cellular network. SPID is also known as RAT/Frequency Selection Priority (RFSP) index. Therefore, the SPID stored in HSS is sometimes referred to as a Subscribed RFSP index. A default value is also possible. A Mobility Management Entity (MME) receives the SPID from the HSS during the UE attach procedure and the SPID is also stored in the MME. At UE context setup, the MME forwards the SPID to the eNB, and the eNB prioritizes the RATs and carriers for both active and idle mode mobility based on the SPID. For roaming subscribers, the MME can remove or add an SPID based on International Mobile Subscriber Identity (IMSI) analysis.

The SPID value mapping in the eNB to a specific set of RATs/carriers (i.e., to be used as dedicated priority information towards the UE) are configurable as it may be operator strategy dependent. Some examples are given below in Table 1. Number 7 indicates highest priority and (No) is "forbidden." For example, SPID value of 2 would indicate that the UE is not allowed to access LTE, and that WCDMA has higher priority than GSM.

TABLE 1

| SPID | LTE C1 | LTE C2 | WCDMA | GSM | Subscription |
| --- | --- | --- | --- | --- | --- |
| Default | 7 | 6 | 5 | 4 | Normal |
| 1 | No | No | 6 | 7 | Telephony only |
| 2 | No | No | 7 | 6 | No LTE |

There are different ways in which to send the SPID from the core network to the RAN. In LTE, the relevant S1AP messages used to send the SPID from the Evolved Packet Core (EPC) to the RAN are INITIAL CONTEXT SETUP REQUEST, UE CONTEXT MODIFICATION REQUEST, DOWNLINK Non-Access Stratum (NAS) TRANSPORT, and HANDOVER REQUEST. In addition, the Subscriber Profile Identity (SPID) for a RAT/frequency priority Information Element (IE) is also transferred between eNBs over the X2 interface at handover.

Handover Restriction List (HRL)

The HRL IE can be used to define roaming and access restrictions for subsequent mobility actions for which the eNB provides information about the target of the mobility action towards the UE, e.g., handover and cell change order, or for Secondary Cell Group (SCG) selection during dual connectivity operation. The HLR can contain information about serving Public Land Mobile Network (PLMN), equivalent PLMNs, forbidden tracking areas, forbidden location areas, and forbidden inter-RATs.

There are different ways in how the HRL can be sent from the core network to the RAN. In LTE, the relevant S1AP messages that can be used to send the HRL from the EPC to the RAN are INITIAL CONTEXT SETUP REQUEST, DOWNLINK NAS TRANSPORT, and HANDOVER REQUEST.

SUMMARY

Embodiments of systems and methods relating to cellular communications network and Wireless Local Area Network (WLAN) integration/aggregation are disclosed. In some embodiments, a method of operation of a base station of a cellular communications network comprises obtaining one or more Allowed WLAN/Unlicensed Band Solution (AWUBS) indications from a core network of the cellular communications network. The one or more AWUBS indications are indicative of one or more AWUBSs allowed for a particular User Equipment device (UE). The method further comprises using one of the one or more AWUBSs with respect to the UE. In this manner, the base station is enabled to obtain an indication(s) of the AWUBS(s) allowed for the UE and then use only an allowed AWUBS for that UE.

In some embodiments, the one or more AWUBS indications consist of a single AWUBS indication that is indicative of a single AWUBS that is allowed for the UE. In other embodiments, the one or more AWUBS indications comprise multiple AWUBS indications that are indicative of multiple AWUBSs that are allowed for the UE.

In some embodiments, obtaining the one or more AWUBS indications from the core network comprises obtaining a list of AWUBS indications, where an ordering of the one or more AWUBS indications within the list of AWUBS indications is indicative of relative priorities of the one or more AWUBS indications. Further, in some embodiments, the relative priorities of the one or more AWUBS indications are UE specific. In other embodiments, the relative priorities of the one or more AWUBS indications are universal for the cellular communications network. In other embodiments, obtaining the one or more AWUBS indications from the core network comprises obtaining a list of AWUBS indications without priorities.

In some embodiments, the one or more AWUBS indications obtained from the core network consist of multiple AWUBS indications, and the method further comprises selecting a desired one of the one or more AWUBSs indicated by the one or more AWUBS indications to be used with respect to the UE. Using the desired one of the one or more AWUBSs comprises using the desired one of the one or more AWUBSs selected by the base station. Further, in some embodiments, selecting the desired one of the one or more AWUBSs comprises selecting the desired one of the one or more AWUBSs based on at least one of a group consisting of: capabilities of the UE, knowledge of one or more AWUBSs supported by the base station, and knowledge of one or more AWUBSs supported by an associated WLAN Access Point (AP).

In other embodiments, the one or more AWUBS indications comprise multiple AWUBS indications indicative of multiple AWUBSs that are allowed for the UE. Obtaining the one or more AWUBS indications from the core network comprises obtaining the AWUBS indications and indications of relative priorities of the AWUBSs indicated by the AWUBS indications from the core network, and selecting the desired one of the one or more AWUBSs comprises selecting the desired one of the one or more AWUBSs based on the relative priorities of the AWUBSs indicated by the AWUBS indications and at least one of a group consisting of: capabilities of the UE, knowledge of one or more AWUBSs supported by the base station, and knowledge of one or more AWUBSs supported by an associated WLAN AP.

In some embodiments, obtaining the one or more AWUBS indications from the core network comprises obtaining the one or more AWUBS indications from the core network when a UE context is created for the UE in a Radio Access Network (RAN) of the cellular communications network. In other embodiments, obtaining the one or more AWUBS indications from the core network comprises obtaining the one or more AWUBS indications from the core network when a UE context is modified for the UE in a RAN of the cellular communications network.

In some embodiments, the method further comprises receiving a request from the UE to transition from idle state to connected state, sending the request to the core network, and, as a result of sending the request to the core network, receiving, from the core network, the one or more AWUBS indications.

In some embodiments, the method further comprises receiving a request from the UE to transition from idle state to connected state, sending the request to the core network, and, as a result of sending the request to the core network, receiving, from the core network, a UE context related request comprising the one or more AWUBS indications.

In some embodiments, obtaining the one or more AWUBS indications from the core network comprises obtaining the one or more AWUBS indications from the core network using a Subscriber Profile Identity (SPID) Information Element associated with the UE. In other embodiments, obtaining the one or more AWUBS indications from the core network comprises obtaining the one or more AWUBS indications from the core network using a Handover Restriction List (HRL) IE associated with the UE. In other embodiments, obtaining the one or more AWUBS indications from the core network comprises obtaining the one or more AWUBS indications from the core network using an IE associated with the UE.

In some embodiments, using the one of the one or more AWUBSs with respect to the UE comprises sending one or more parameters to the UE. In other embodiments, using the one of the one or more AWUBSs with respect to the UE comprises providing one of a group consisting of Packet Data Convergence Protocol (PDCP) level cellular network and WLAN integration, Radio Link Control (RLC) level Third Generation Partnership Project (3GPP) and WLAN integration, and Medium Access Control (MAC) level 3GPP and WLAN integration with respect to the UE. In other embodiments, using the one of the one or more AWUBSs with respect to the UE comprises configuring a Secondary Component Carrier (SCC) for the UE in an unlicensed frequency spectrum according to a Licensed Assisted Access (LAA) scheme.

Embodiments of a base station of a cellular communications network are also disclosed.

Embodiments of a method of operation of Mobility Management Entity (MME) of a cellular communications network are also disclosed. In some embodiments, the method of operation of the MME comprises obtaining subscription information for a UE, wherein the subscription information comprises one or more AWUBS indications that are indicative of one or more AWUBSs that are allowed for the UE. The method further comprises sending a UE context related request to a base station in a RAN of the cellular communications network, where the UE context related request comprises one of the one or more AWUBS indications.

In some embodiments, the one or more AWUBS indications consists of a single AWUBS indication that is indicative of a single AWUBS that is allowed for the UE. In other embodiments, the one or more AWUBS indications comprises multiple AWUBS indications that are indicative of multiple AWUBSs that are allowed for the UE.

In some embodiments, the subscription information comprises a list of AWUBS indications consisting of the one or more AWUBS indications, where an ordering of the one or more AWUBS indications within the list of AWUBS indications is indicative of relative priorities of the one or more AWUBS indications. In some embodiments, the relative priorities of the one or more AWUBS indications are UE specific. In other embodiments, the relative priorities of the one or more AWUBS indications are universal for the cellular communications network. In other embodiments, the subscription information comprises a list of AWUBS indications consisting of the one or more AWUBS indications without priorities.

In some embodiments, the UE context related request comprises a SPID IE associated with the UE that comprises the one or more AWUBS indications. In other embodiments, the UE context related request comprises a HRL IE associated with the UE that comprises the one or more AWUBS indications. In other embodiments, the UE context related request comprises an IE associated with the UE that comprises the one or more AWUBS indications.

Embodiments of a MME are also disclosed.

Embodiments of a method of operation of a Home Subscriber Server (HSS) of a cellular communications network are also disclosed. In some embodiments, the method of operation of the HSS comprises receiving a request from a network node for subscription information for a UE and, in response, sending the subscription information for the UE to the network node. The subscription information comprises one or more AWUBS indications that are indicative of one or more AWUBSs that are allowed for the UE.

In some embodiments, the one or more AWUBS indications consists of a single AWUBS indication that is indicative of a single AWUBS that is allowed for the UE. In other embodiments, the one or more AWUBS indications comprises multiple AWUBS indications that are indicative of multiple AWUBSs that are allowed for the UE.

In some embodiments, the subscription information comprises a list of AWUBS indications consisting of the one or more AWUBS indications, where an ordering of the one or more AWUBS indications within the list of AWUBS indications is indicative of relative priorities of the one or more AWUBS indications. In some embodiments, the relative priorities of the one or more AWUBS indications are UE specific. In other embodiments, the relative priorities of the one or more AWUBS indications are universal for the cellular communications network. In other embodiments, the subscription information comprises a list of AWUBS indications consisting of the one or more AWUBS indications without priorities.

In some embodiments, sending the subscription information to the network node comprises sending the subscription information such that the subscription information comprises an IE comprising the one or more AWUBS indications.

Embodiments of an HSS are also disclosed.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

FIGS. 1A through 1C illustrate three different protocol options for tight integration/aggregation between Third Generation Partnership Project (3GPP) and a Wireless Local Area Network (WLAN) at the Packet Data Convergence Protocol (PDCP), Radio Link Control (RLC), and Medium Access Control (MAC) levels, respectively;

DETAILED DESCRIPTION

Figure 2A:
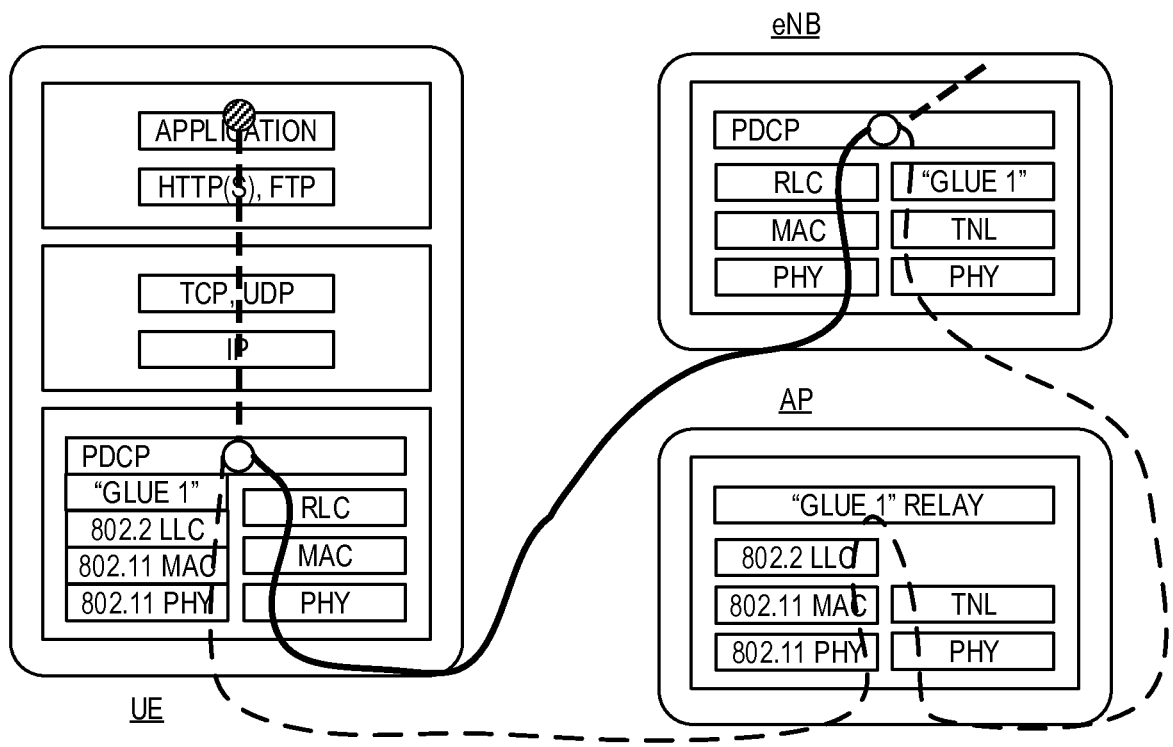
FIG. 2A illustrates relaying of Logical Link Control (LLC) frames towards a standalone base station for the case of PDCP level aggregation.
Figure 2B:
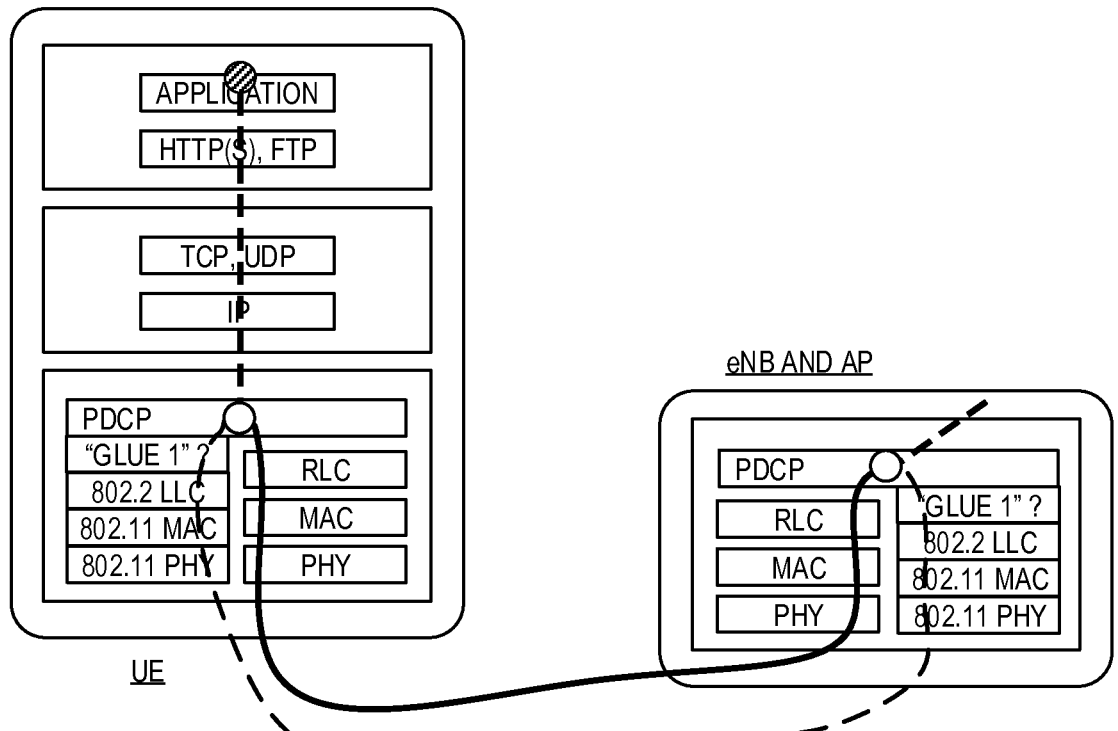
FIG. 2B illustrates PDCP level aggregation with a co-located/combined base station and WLAN Access Point (AP)
Figure 3:
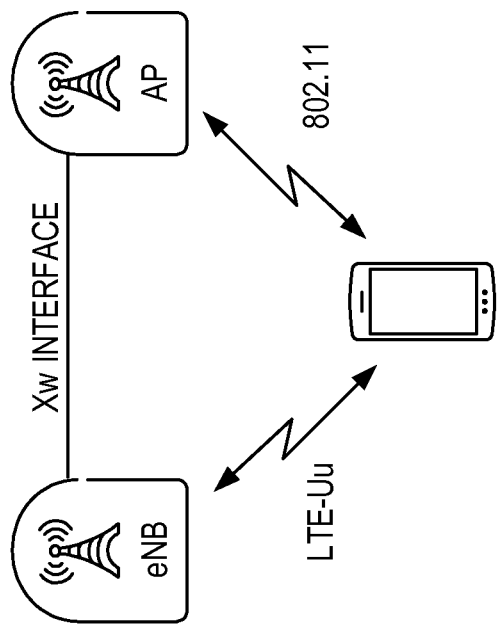
FIG. 3 illustrates an architecture for 3GPP and WLAN integration/aggregation including an interface between the base station and WLAN AP.
Figure 4:
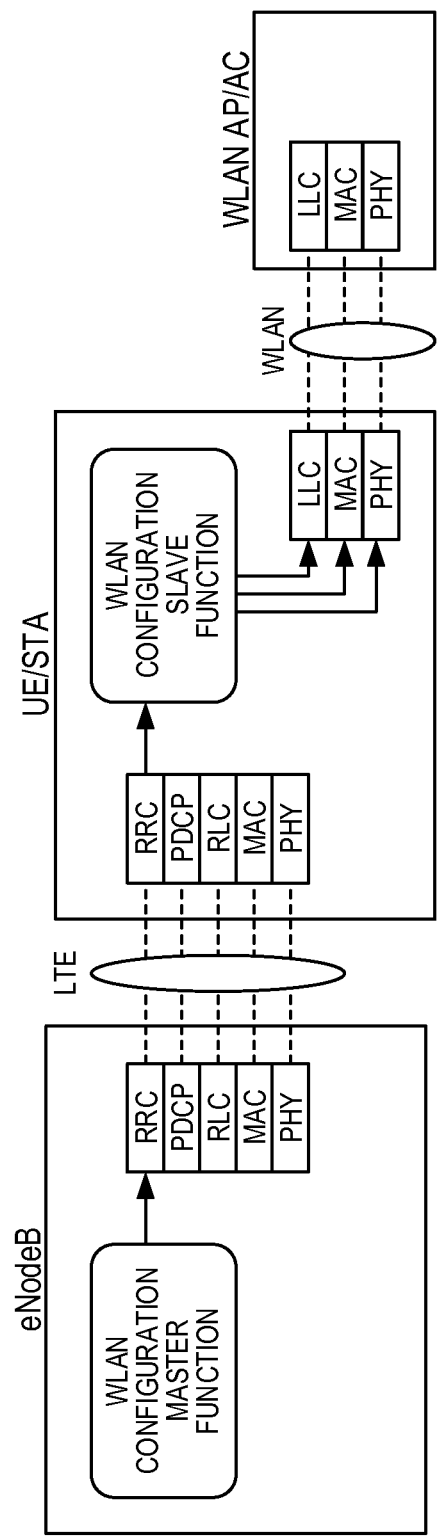
FIGS. 4 and 5 illustrate a control plane protocol architecture between a User Equipment device (UE) and a base station and also between a base station and the WLAN AP.
Figure 5:
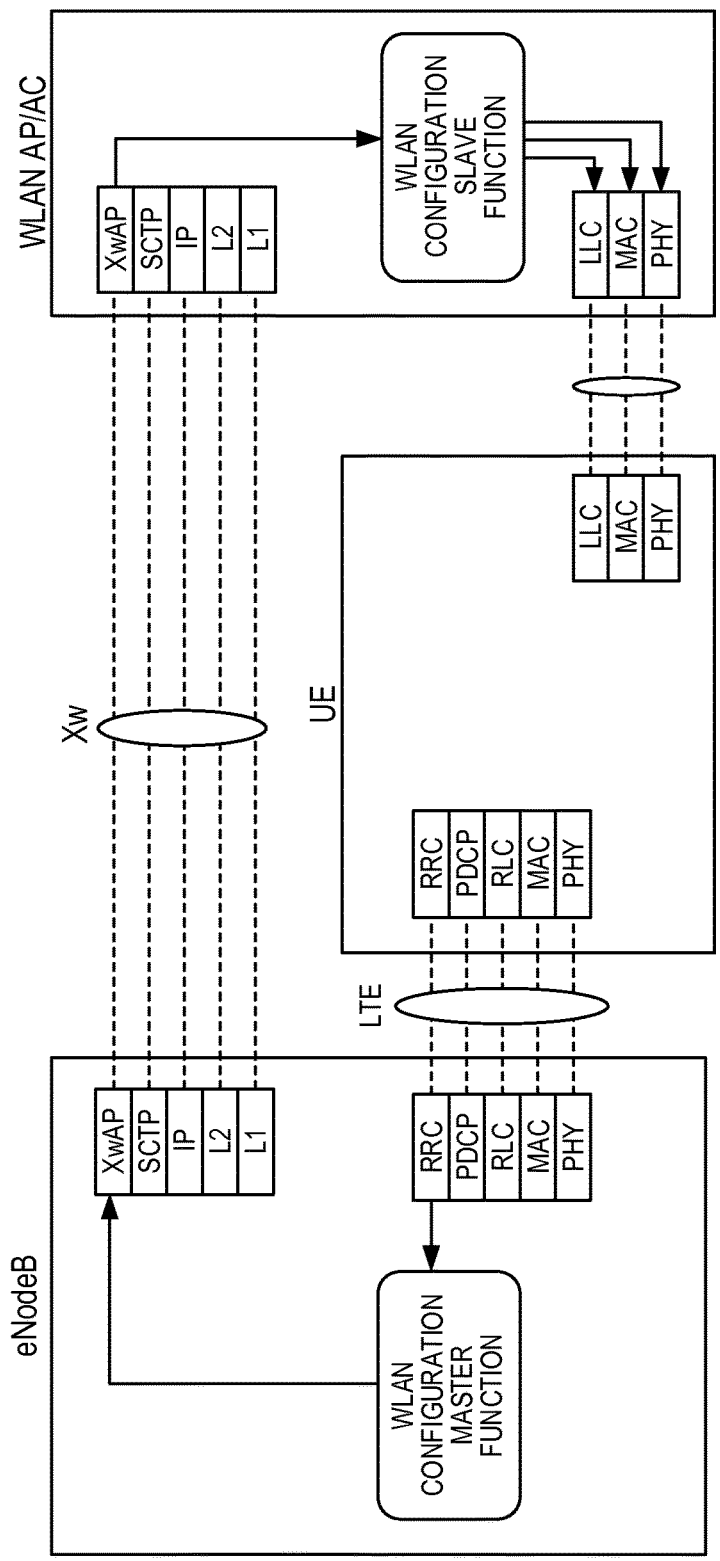
Figure 6:
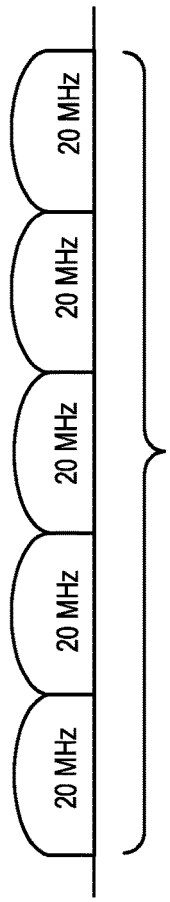
FIG. 6 illustrates Carrier Aggregation (CA)
Figure 7:
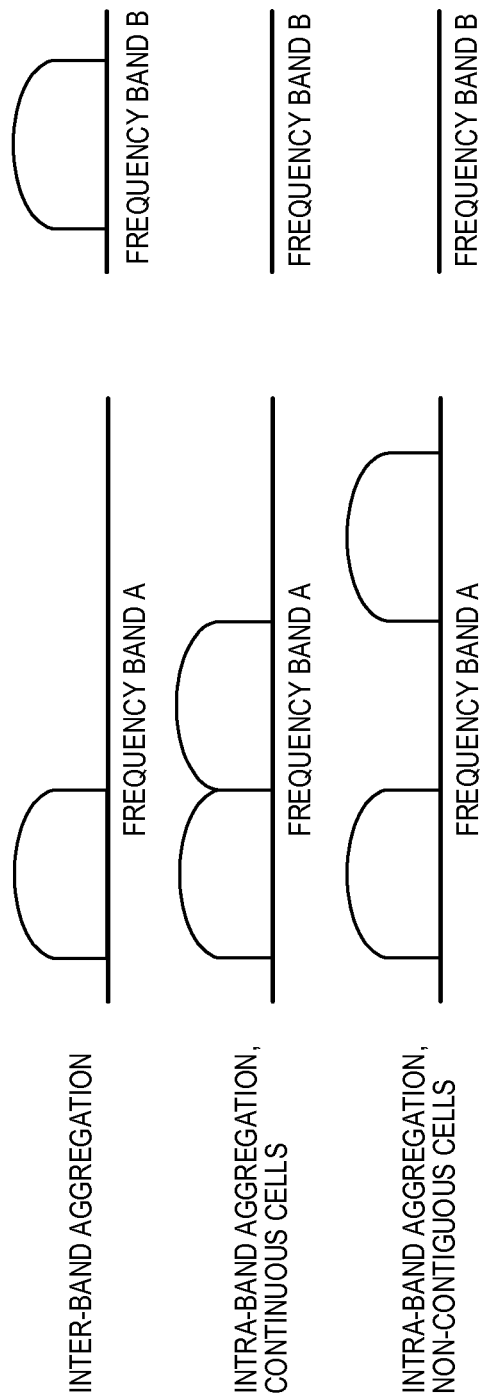
FIG. 7 illustrates different deployment scenarios for CA.
Figure 8:
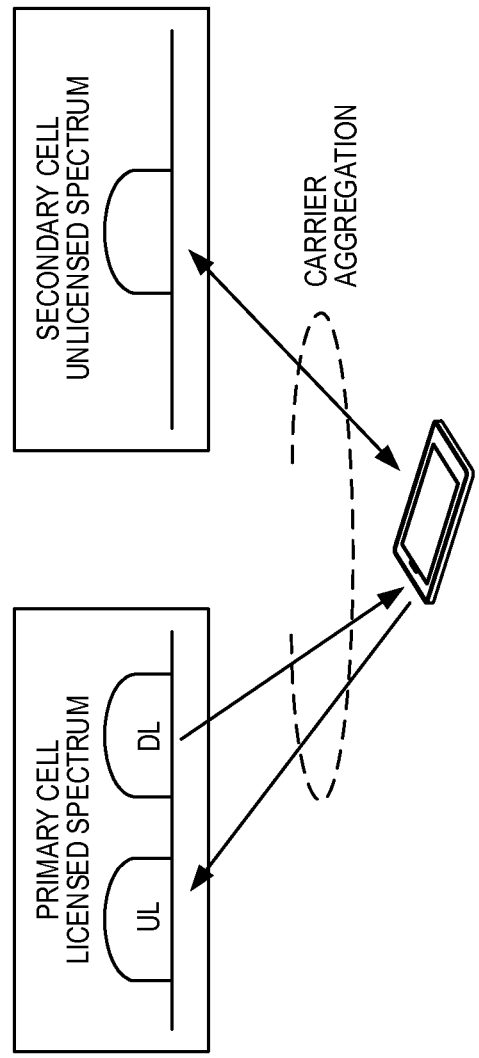
FIG. 8 illustrates Licensed Assisted Access (LAA)
Figure 9:
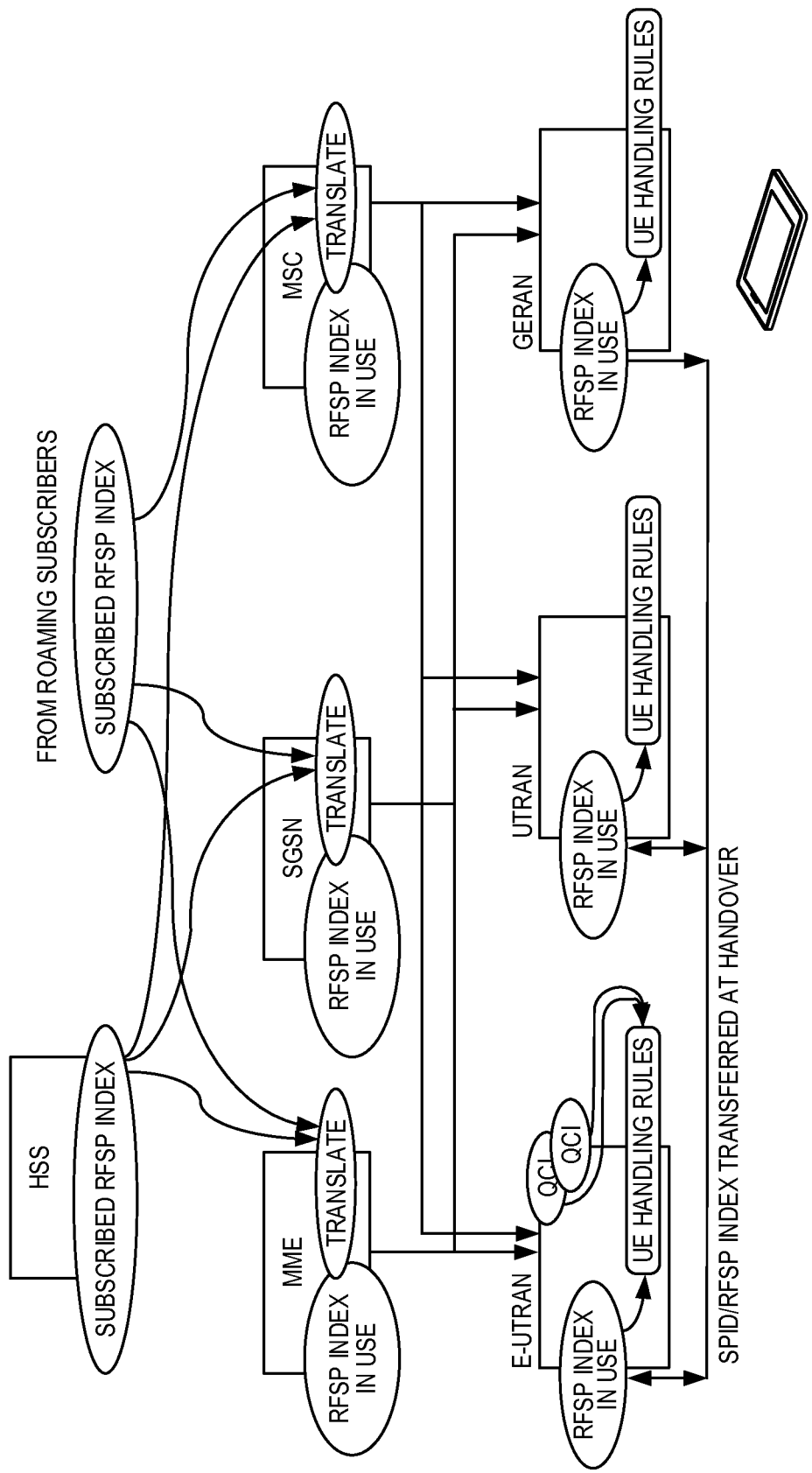
FIG. 9 illustrates Subscriber Profile Identity (SPID) handling in different nodes of the cellular network.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

An interworking mechanism between Wireless Local Area Networks (WLANs) and Third Generation Partnership Project (3GPP) networks has been standardized in 3GPP Release12 (Rel-12). However, only the concept of interworking between the two networks has been covered in 3GPP Rel-12 (i.e., though data traffic from/to a given User Equipment device (UE) can either be provisioned via the WLAN or 3GPP networks), so a specific traffic/flow is associated with only one of the two.

The aggregation of WLAN and 3GPP at a higher layer by employing mechanisms such as Multi-Path Transmission Control Protocol (MPTCP) has been known for quite some time, while aggregation between the two networks at a lower layer is a rather new concept that is gaining a lot of momentum in the industry. A work item on tight WLAN aggregation has been approved for 3GPP Long Term Evolution (LTE) Release 13 (Rel-13) [Intel Corporation et al., "RP-150510: New WI Proposal: LTE-WLAN Radio Level Integration and Interworking Enhancement," 3GPP Technical Specification Group (TSG) Radio Access Network (RAN) Meeting #67, Mar. 9-12, 2015, Shanghai, China], as described above in the Background section entitled "Tight Integration/Aggregation between 3GPP and WLAN." In addition, 3GPP is already working on Licensed Assisted Access (LAA), as described above in the Background section entitled "Carrier Aggregation (CA) and Licensed Assisted Access (LAA)."

It is assumed that a particular UE and a particular network will simultaneously support multiple of the above solutions, or mechanisms, for integration/aggregation between 3GPP and WLAN as well as one or more future solutions for integration/aggregation between 3GPP and WLAN. Currently, there is no mechanism for the operator (and the network) to control which of the solutions is selected for a particular subscriber (or subscriber group). Thus, new mechanisms are needed in order to control which of the above solutions for 3GPP and WLAN integration/aggregation is to be used when combining traditional usage of 3GPP access with WLAN and/or unlicensed spectrum.

In order to address this issue, systems and methods are disclosed herein that enable a cellular network (e.g., a network node such as a base station), and thus the network operator, to control which of the different solutions, or mechanisms, for 3GPP and WLAN and/or unlicensed spectrum integration/aggregation is used for a particular subscriber and, thus, a particular UE. In some embodiments, a core network of a cellular communications network provides an indication(s) of a preferred solution(s) to a RAN (e.g., to a base station, which in 3GPP LTE, is referred to as an enhanced or evolved Node B (eNB)). The indication(s) of the preferred solution(s) is, at least in some embodiments, provided from the core network to the RAN when a UE context for the UE is created or modified in the RAN (e.g., during a UE attachment procedure). The indication(s) is referred to herein as an Allowed WLAN/Unlicensed Band Solution(s) (AWUBS(s)).

In some embodiments, the AWUBS(s) of the preferred solution(s) is a single AWUBS of a single preferred solution. In other embodiments, the AWUBS(s) of the preferred solution(s) includes multiple AWUBSs for multiple preferred solutions. In some embodiments, a priority, or preference, order between the different preferred solutions may also be indicated. In other embodiments, a priority, or preference, order between the different preferred solutions is not indicated. In some embodiments, the core network communicates the AWUBS(s) of the preferred solution(s) to the RAN via an existing Information Element (IE) (e.g., Subscriber Profile Identity (SPID) and/or Handover Restriction List (HRL)). In other embodiments, the core network communicates the AWUBS(s) of the preferred solution(s) to the RAN via a new IE.

Figure 10:
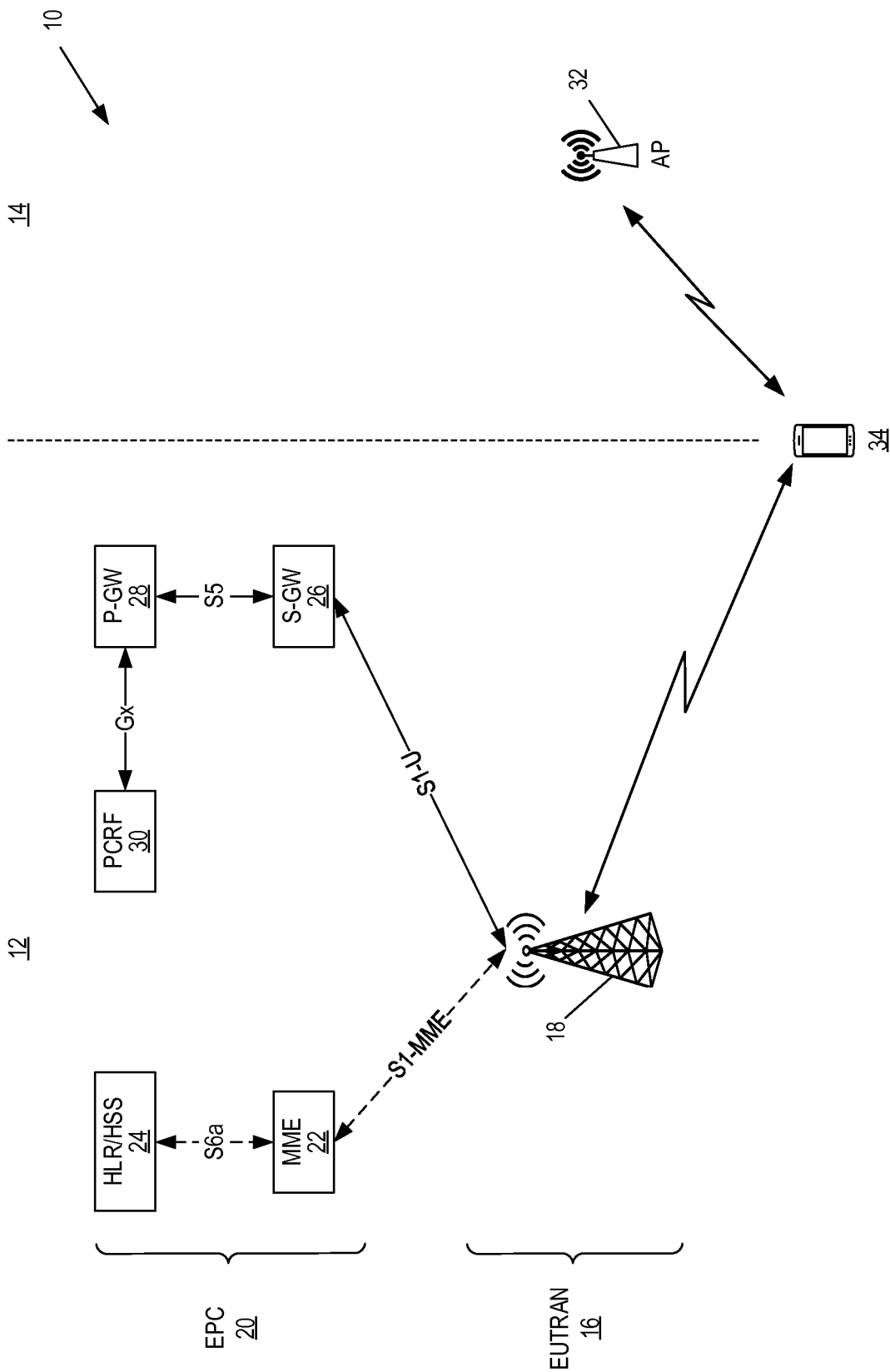
FIG. 10 illustrates a wireless system that enables integration/aggregation of a cellular network and a WLAN according to some embodiments of the present disclosure.

In this regard, FIG. 10 illustrates a wireless system 10 that enables integration/aggregation of a cellular network 12 and a WLAN 14. In the description provided herein, the cellular network 12 is a 3GPP network (e.g., an LTE network) and, as such, 3GPP terminology is oftentimes used. However, the present disclosure is not limited thereto. As such, while 3GPP terminology is oftentimes used herein, it should be understood that these terms should be understood in their general sense (e.g., an eNB should be understood generally as a base station and a UE should be understood generally as a wireless device) unless explicitly stated or otherwise required.

As illustrated, the cellular network 12 includes an Evolved Universal Terrestrial RAN (EUTRAN) 16, which includes an eNB 18 (which may more generally be referred to herein as a base station). Note that while only one eNB 18 is illustrated for clarity and ease of discussion, the EUTRAN 16 typically includes many eNBs 18. The cellular network 12 also includes an Evolved Packet Core (EPC) 20, which includes a Mobility Management Entity (MME) 22 communicatively coupled to the eNB 18 via an S1-MME interface, a Home Location Register (HLR)/Home Subscriber Server (HSS) 24 communicatively coupled to the MME 22 via an S6a interface, a Serving Gateway (S-GW) 26 communicatively coupled to the eNB 18 via an S1-U interface, a Packet Data Network Gateway (P-GW) 28 communicatively coupled to the S-GW 24 via an S5 interface, and a Policy and Charging Rules Function (PCRF) 30 communicatively coupled to the P-GW 28 via a Gx interface. The operation and functionality of the MME 22, the HLR/HSS 24, the S-GW 26, the P-GW 28, and the PCRF 30 are well-known to those of ordinary skill in the art and, as such, are not repeated herein. The WLAN 14 includes an Access Point (AP) 32, but may also include Access Controllers (ACs), Gateways (GWs), etc. Notably, while in this example the eNB 18 and the AP 32 are not co-located, in some implementations the eNB 18 and the AP 32 may be co-located. Also note that the HLR/HSS 24 may also be referred to herein (equivalently) as an HSS 24, where the HLR is a part of the HSS 24.

A UE 34 supports wireless communication with both the eNB 18 of the cellular network 12 and the AP 32 of the WLAN 14. Note that while only one UE 34 is illustrated, there may be many UEs 34. Further, the cellular network 12, the WLAN 14, and the UE 34 each support one or more solutions for integration/aggregation of the cellular network 12 (e.g., 3GPP) and the WLAN 14 and/or unlicensed frequency spectrum. As noted above, these solutions are referred to herein as AWUBSs. As an example, the possible values for the AWUBS indications and the corresponding AWUBSs may be or include:

AWUBS-1: LTE/WLAN interworking as defined in 3GPP Rel-12

AWUBS-2: LTE/WLAN interworking as defined in 3GPP Rel-13 (e.g., additional functionality added to LTE/WLAN interworking as defined in 3GPP Rel-12 such as, for example, the addition of WLAN measurement reporting over the LTE RRC protocol).

AWUBS-3: Tight LTE/WLAN aggregation as defined in 3GPP Rel-13

AWUBS-4: LAA as defined in 3GPP Rel-13

AWUBS-5: Future extension (e.g., LAA as defined in 3GPP Release 14 (Rel-14)).

Note that the AWUBSs and the corresponding values for the AWUBS indication above are provided only as an example. Other AWUBSs and corresponding values or the AWUBS indications may additionally or alternatively be used.

Figure 11:
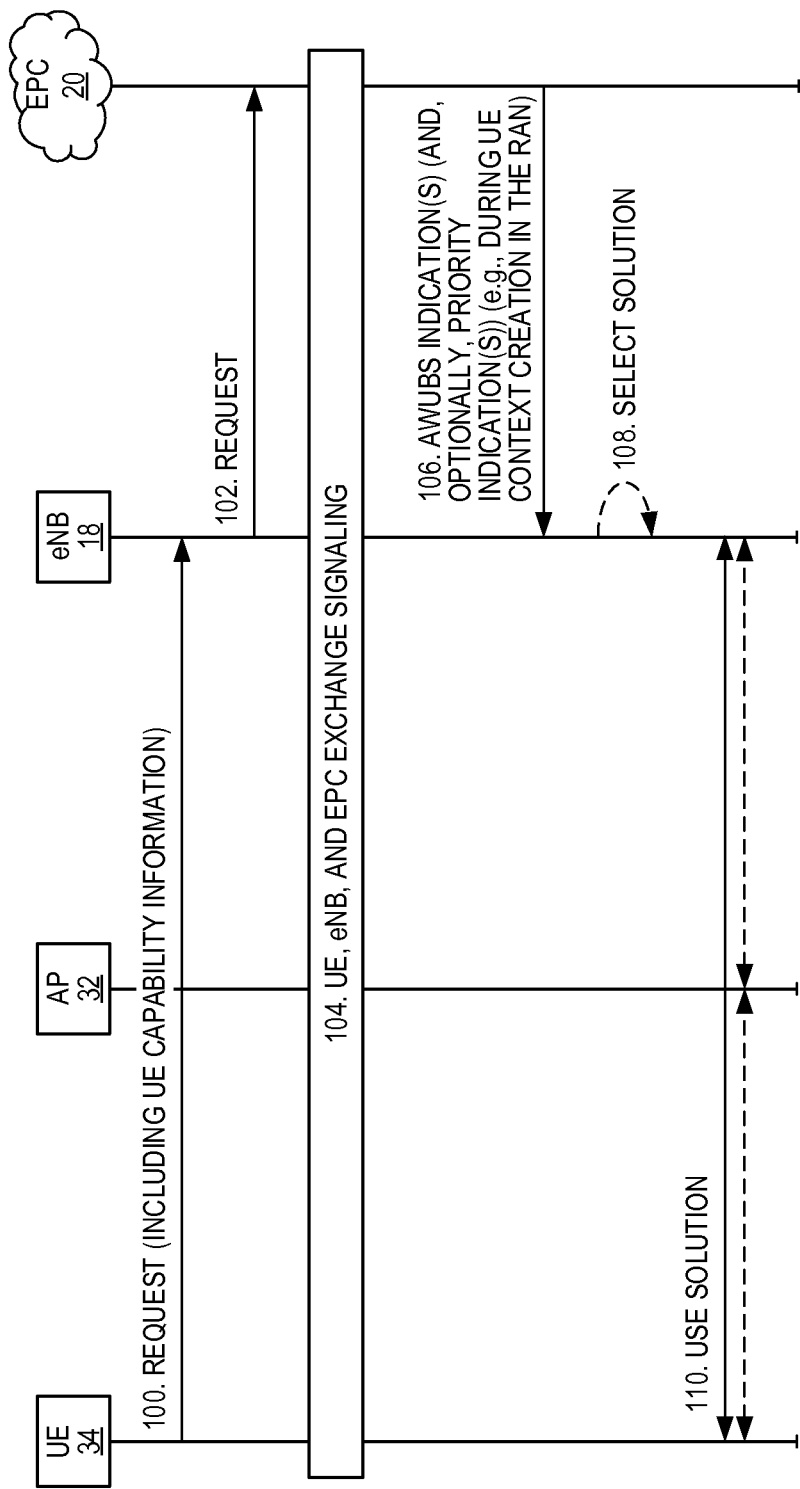
FIGS. 11 through 15 illustrate the operation of the wireless system of FIG. 10 according to various embodiments of the present disclosure.

The cellular network 12, the WLAN 14, and the UE 34 may support different sets of AWUBSs. Systems and methods are disclosed herein that enable the cellular network 12 (and thus a network operator) to decide which AWUBS is used for the UE 34. In this regard, FIG. 11 illustrates the operation of the wireless system 10 according to some embodiments of the present disclosure. In this embodiment, the AWUBS indication(s) is(are) provided to the eNB 18 from the EPC 20 during a procedure when UE context is created or modified in the EUTRAN 16, but the present disclosure is not limited thereto. As illustrated, the UE 34 sends a request to the eNB 18, where the request is to transition the UE 34 from an IDLE state to a CONNECTED state (e.g., from RRC_IDLE to RRC_CONNECTED in LTE), in this example (step 100). The request may be, for example, an (initial) attach request, but is not limited thereto. The request may be any request made by the UE 34 to transition from the IDLE state or the CONNECTED state. In some embodiments, the request includes UE capability information, where the UE capability information may include, for example, information that explicitly or implicitly indicates which AWUBS(s) is(are) supported by the UE 34. The eNB 18 sends the request to the EPC 20 (step 102). At this point, the UE 34, the eNB 18, and the EPC 20 exchange conventional signaling related to the request (step 104).

Either after or sometime during the exchange of related signaling, as a result of the request, the EPC 20 sends an AWUBS indication(s) to the eNB 18, where the AWUBS indication(s) is(are) indicative of an AWUBS(s) that is permitted to be used, or allowed, for the UE 34 (step 106). In some embodiments, the AWUBS indication(s) is a single AWUBS indication that is indicative of a single AWUBS that is permitted to be used for the UE 34. In other embodiments, the AWUBS indication(s) includes multiple AWUBS indications that are indicative of multiple AWUBSs that are permitted to be used for the UE 34. Further, in some embodiments, the EPC 20 also communicates relative priorities, or preferences, of the multiple AWUBSs. For example, the AWUBS indications may be provided in a list of AWUBS indications where the ordering of the list indicates the relative priorities of the corresponding AWUBSs. In other embodiments, the relative priorities, or preferences, of the multiple AWUBSs are not indicated by the EPC 20. As discussed below in detail, the AWUBS indication(s) (and, in some embodiments, the relative priorities of the corresponding AWUBSs indicated by the AWUBS indication) may be communicated from the EPC 20 to the eNB 18 using any suitable mechanism such as, but not limited to, a SPID, a HRL, and/or a new IE.

Optionally (i.e., in some embodiments), the eNB 18 selects the AWUBS to be used for the UE 34 based on the AWUBS indication(s) received from the EPC 20 (step 108). This selection is particularly beneficial for embodiments in which multiple AWUBS indications are received from the eNB 18. In some embodiments, the eNB 18 selects the AWUBS to be used based on the AWUBS indication(s) and, possibly, the relative priorities of the corresponding AWUBSs and additional information such as, for example, knowledge of which AWUBS(s) are supported by the EUTRAN 16 (e.g., the eNB 18) and/or knowledge of which AWUBS(s) are supported by the WLAN 14. Thus, for example, the eNB 18 may select the highest priority AWUBS indicated by the AWUBS indication(s) received from the EPC 20 for the UE 34 that is also supported by the eNB 18 and the AP 32 of the WLAN 14. Note, however, that if only one AWUBS indication is received from the EPC 20, then, in some embodiments, the selection step 108 is not performed. In other words, the single AWUBS indicated by the EPC 20 may be automatically selected.

Lastly, the eNB 18 and the UE 34 use the (selected or indicated) AWUBS (step 110). With respect to step 110, dashed lines between the UE 34 and the AP 32 and between the eNB 18 and the AP 32 indicate that, in some of the AWUBS solutions, the AP 32 is also impacted. Notably, the details of how the eNB 18 and the UE 34 use the AWUBS depend on the particular AWUBS. For example, if the (selected or indicated) AWUBS is 3GPP/WLAN integration according to 3GPP Rel-12, the eNB 18 may use the AWUBS by sending one or more assistance parameters to the UE 34, where the UE 34 uses the assistance parameter(s) for access selection. As discussed above, these assistance parameters may include thresholds, an Offloading Preference Indicator (OPI), WLAN identifiers, and/or RAN rules/policies. As another example, if the (selected or indicated) AWUBS is 3GPP/WLAN integration according to 3GPP Rel-13, the eNB 18 may use the AWUBS by activating and performing WLAN measurement reporting over the LTE RRC protocol. As another example, if the (indicated or selected) AWUBS is tight integration/aggregation according to 3GPP Rel-13, then the eNB 18 may use the AWUBS by, for instance, providing Packet Data Convergence Protocol (PDCP), Radio Link Control (RLC), or Medium Access Control (MAC) 3GPP and WLAN integration/aggregation with respect to the UE 34. Further, the eNB 18 may use the AWUBS by, for example, configuring the WLAN AP 32 via an Xw interface, forward aggregated data to the WLAN AP 32 via the Xw interface, etc. As yet another example, if the (indicated or selected) AWUBS is LAA, then the eNB 18 may, for example, configure a Secondary Component Carrier (SCC) for the UE 34 in an unlicensed frequency band according to a LAA scheme.

Figure 12:
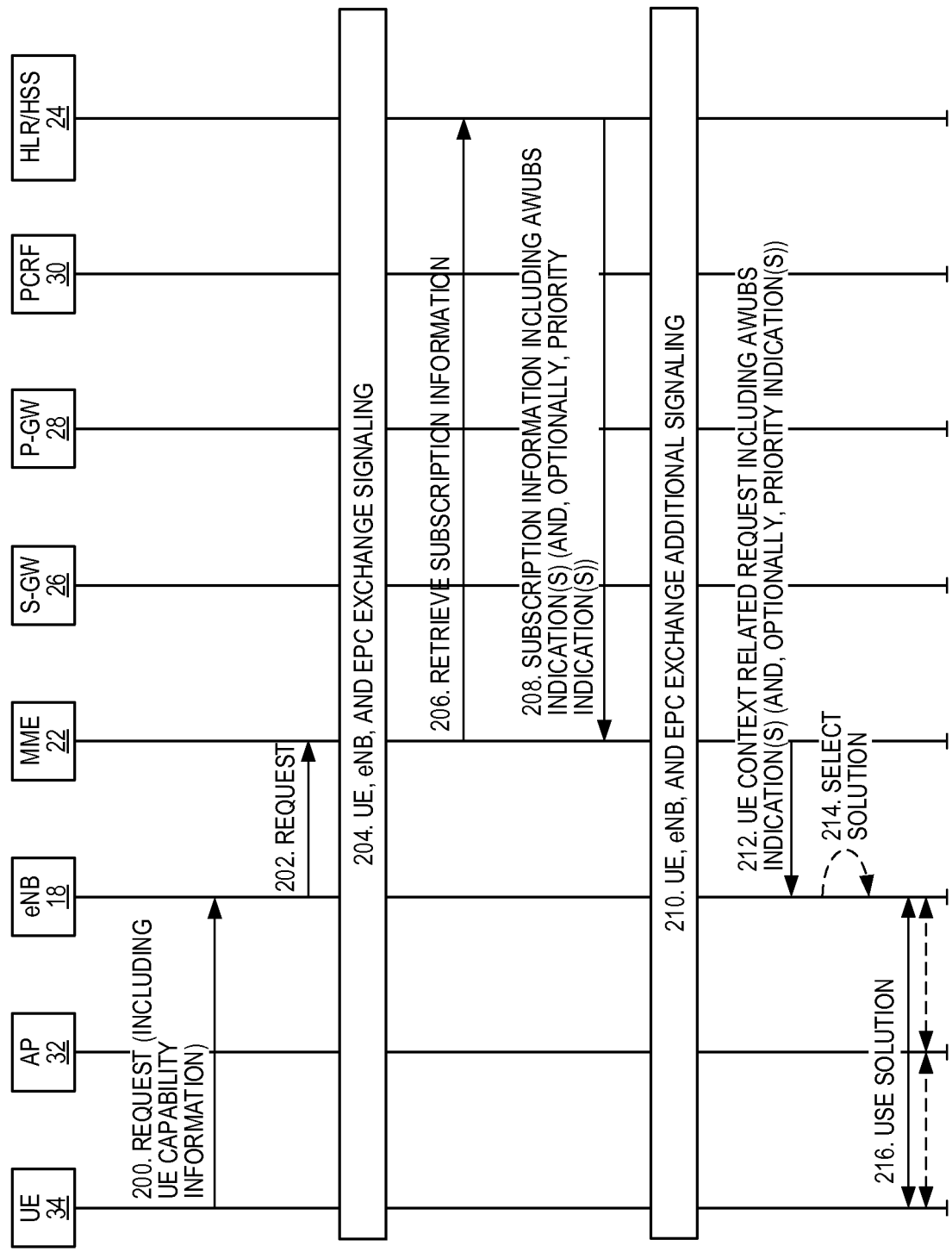

FIG. 12 illustrates the operation of the wireless system 10 in more detail according to some embodiments of the present disclosure. FIG. 12 is similar to FIG. 11, but provides further details regarding the interaction between the eNB 18 and the EPC 20 according to some embodiments of the present disclosure. As illustrated, the UE 34 sends a request to the eNB 18 to transition the UE 34 from the IDLE state to the CONNECTED state (step 200). The request may be, for example, an (initial) attach request, but is not limited thereto. The request may be any request made by the UE 34 to transition from the IDLE state or the CONNECTED state. In some embodiments, the request includes UE capability information, where the UE capability information may include, for example, information that explicitly or implicitly indicates which AWUBS(s) is(are) supported by the UE 34. The eNB 18 sends the request to the MME 22 within the EPC 20 (step 202). At this point, the UE 34, the eNB 18, and the EPC 20 exchange conventional signaling related to the request (step 204).

After the exchange of the signaling in step 204, as a result of the request, the MME 22 retrieves subscription information for the UE 34 (or subscriber) from the HLR/HSS 24 (step 206). The HLR/HSS 24 then sends subscription information for the UE 34 to the MME 22, where the subscription information includes an AWUBS indication(s) that is(are) indicative of an AWUBS(s) that is permitted to be used, or allowed, for the UE 34 (step 208). As discussed above, in some embodiments, the AWUBS indication(s) is a single AWUBS indication that is indicative of a single AWUBS that is permitted to be used for the UE 34. In other embodiments, the AWUBS indication(s) includes multiple AWUBS indications that are indicative of multiple AWUBSs that are permitted to be used for the UE 34. Further, in some embodiments, the subscription information also communicates relative priorities, or preferences, of the multiple AWUBSs. For example, the AWUBS indications may be provided in a list of AWUBS indications within the subscription information, where the ordering of the list indicates the relative priorities of the corresponding AWUBSs. In other embodiments, the relative priorities, or preferences, of the multiple AWUBSs are not indicated.

After the MME 22 receives the subscription information for the UE 34, some additional signaling related to the request may be exchanged between the UE 34, the eNB 18, and the EPC 20 (step 210). The MME 22 then sends a UE context related request (e.g., a UE context creation request (e.g., a S1AP initial context setup request in LTE) or a UE context modification request) to the eNB 18, where the UE context related request includes the AWUBS indication(s) and, in some embodiments, the relative priorities of the indicated AWUBSs (step 212). Note that while step 212 is shown separately here, this signaling could be part of the signaling in step 210. In some embodiments, the AWUBS indication(s) are communicated in the UE context related request using an SPID IE, a HRL IE, and/or a new IE.

As discussed above, optionally (i.e., in some embodiments), the eNB 18 selects the AWUBS to be used for the UE 34 based on the AWUBS indication(s) received from the MME 22 (step 214). Again, this selection is particularly beneficial for embodiments in which multiple AWUBS indications are received from the eNB 18. In some embodiments, the eNB 18 selects the AWUBS to be used based on the AWUBS indication(s) and, possibly, the relative priorities of the corresponding AWUBSs and additional information such as, for example, knowledge of which AWUBS(s) are supported by the EUTRAN 16 (e.g., the eNB 18) and/or knowledge of which AWUBS(s) are supported by the WLAN 14. Note, however, that if only one AWUBS indication is received from the EPC 20, then, in some embodiments, the selection step 214 is not performed. In other words, the single AWUBS indicated by the EPC 20 may be automatically selected. Lastly, the eNB 18 and the UE 34 use the (selected or indicated) AWUBS (step 216). With respect to step 216, dashed lines between the UE 34 and the AP 32 and between the eNB 18 and the AP 32 indicate that, in some of the AWUBS solutions, the AP 32 is also impacted.

Figure 13:
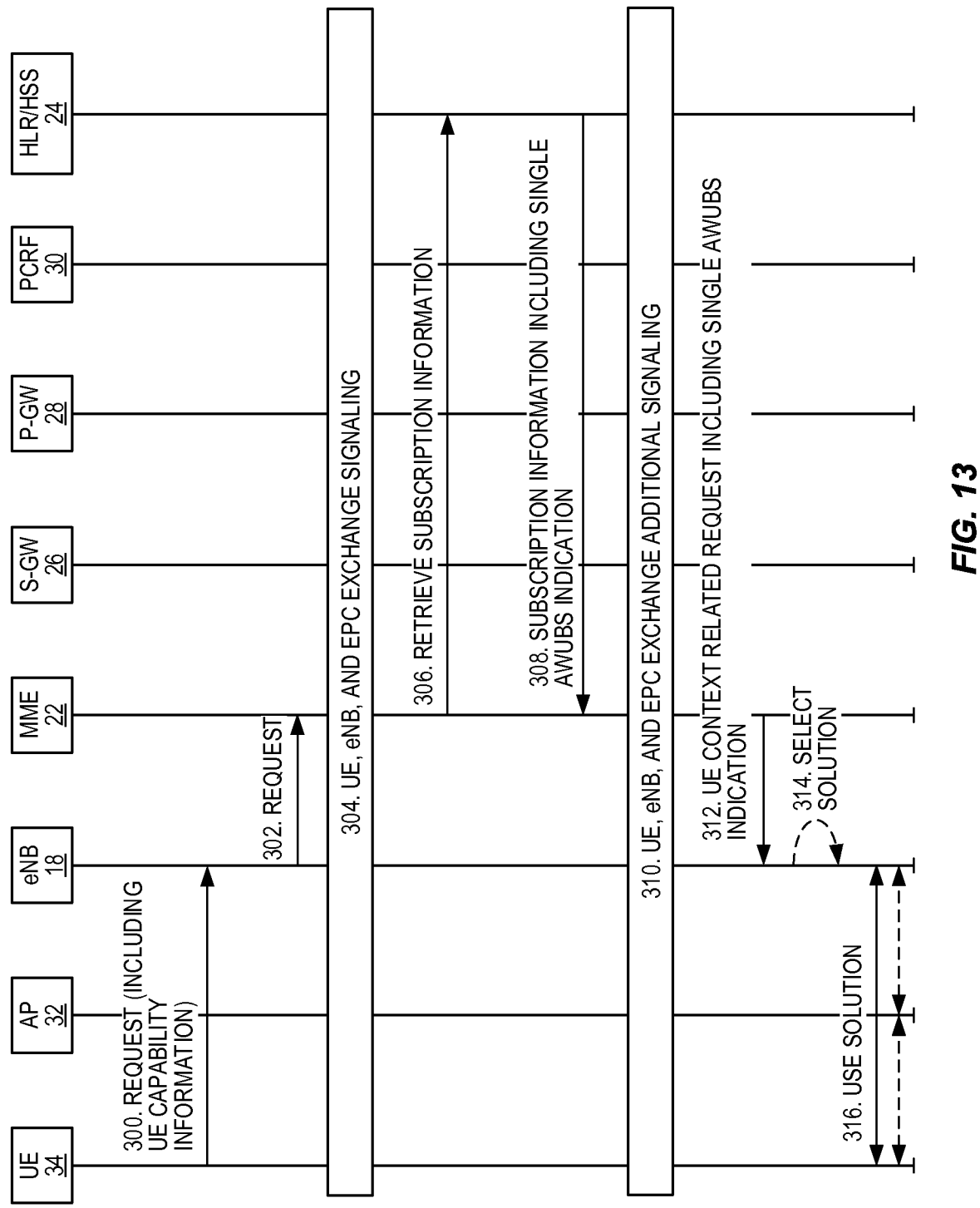

FIG. 13 illustrates the operation of the wireless system 10 according to some embodiments of the present disclosure. FIG. 13 is similar to FIG. 12 but where there is only a single AWUBS indication. As illustrated, the UE 34 sends a request to the eNB 18 to transition the UE 34 from the IDLE state to the CONNECTED state (step 300). The request may be, for example, an (initial) attach request, but is not limited thereto. The request may be any request made by the UE 34 to transition from the IDLE state or the CONNECTED state. In some embodiments, the request includes UE capability information, where the UE capability information may include, for example, information that explicitly or implicitly indicates which AWUBS(s) is(are) supported by the UE 34. The eNB 18 sends the request to the MME 22 within the EPC 20 (step 302). At this point, the UE 34, the eNB 18, and the EPC 20 exchange conventional signaling related to the request (step 304).

After the exchange of signaling related to the request in step 304, the MME 22 retrieves subscription information for the UE 34 (or subscriber) from the HLR/HSS 24 (step 306). The HLR/HSS 24 then sends subscription information for the UE 34 to the MME 22, where the subscription information includes a single AWUBS indication that is indicative of a single AWUBS that is permitted to be used, or allowed, for the UE 34 (step 308). After the MME 22 receives the subscription information for the UE 34, some additional signaling related to the request may be exchanged between the UE 34, the eNB 18, and the EPC 20 (step 310). The MME 22 then sends a UE context related request to the eNB 18, where the UE context related request includes the single AWUBS indication (step 312). The UE context related request may be, for example, a UE context creation request or a UE context modification request.

In some embodiments, the AWUBS indication is communicated in the UE context related request as an SPID IE, a HRL IE, and/or a new IE. With respect to an SPID IE, the SPID IE is currently limited to 8 bits (i.e., value range from 1 to 256). The number of total AWUBS solutions may limit the different possibilities for the AWUBS indication. If the total number of solutions is less than 4, then it is enough with 2 bits to indicate which of the solutions is permitted, or allowable, for the UE 34. Similarly, if the number of solutions is 2, then 1 bit suffices; and, if the total number of solutions is 8 or less, then 3 bits will suffice. Referring to the example above for AWUBS-1 through AWUBS-4, there are, in that example, 4 different solutions and, therefore, 2 bits of the SPID are needed for the AWUBS indication. These 2 bits could be any of the 8 bits of the SPID.

In other embodiments, the AWUBS indication is communicated in the UE context related request as an HRL IE. The HRL is not space-limited in the same sense as SPID and, in this case, the different values for the AWUBS indication can be indicated, for example, as illustrated in Table 2 below. The principle described for HRL can also be used for any new IE instead of the HRL IE.

TABLE 2

| IE/Group Name | Presence | Range | IE type and reference | Semantics description |
|---|---|---|---|---|
| Allowed WLAN/ Unlicensed Band Solutions | O | | ENUMERATED (AWUBS-1, AWUBS-2, AWUBS-3, AWUBS-4, AWUBS-5, . . . ) | |

As discussed above, optionally (i.e., in some embodiments), the eNB 18 selects the AWUBS to be used for the UE 34 based on the AWUBS indication(s) received from the MME 22 (step 314). Here, since there is only a single AWUBS indication, step 314 may not be performed. In other words, the single AWUBS indicated by the EPC 20 may be automatically selected. Lastly, the eNB 18 and the UE 34 use the (selected or indicated) AWUBS (step 316). With respect to step 316, dashed lines between the UE 34 and the AP 32 and between the eNB 18 and the AP 32 indicate that, in some of the AWUBS solutions, the AP 32 is also impacted.

Figure 14:
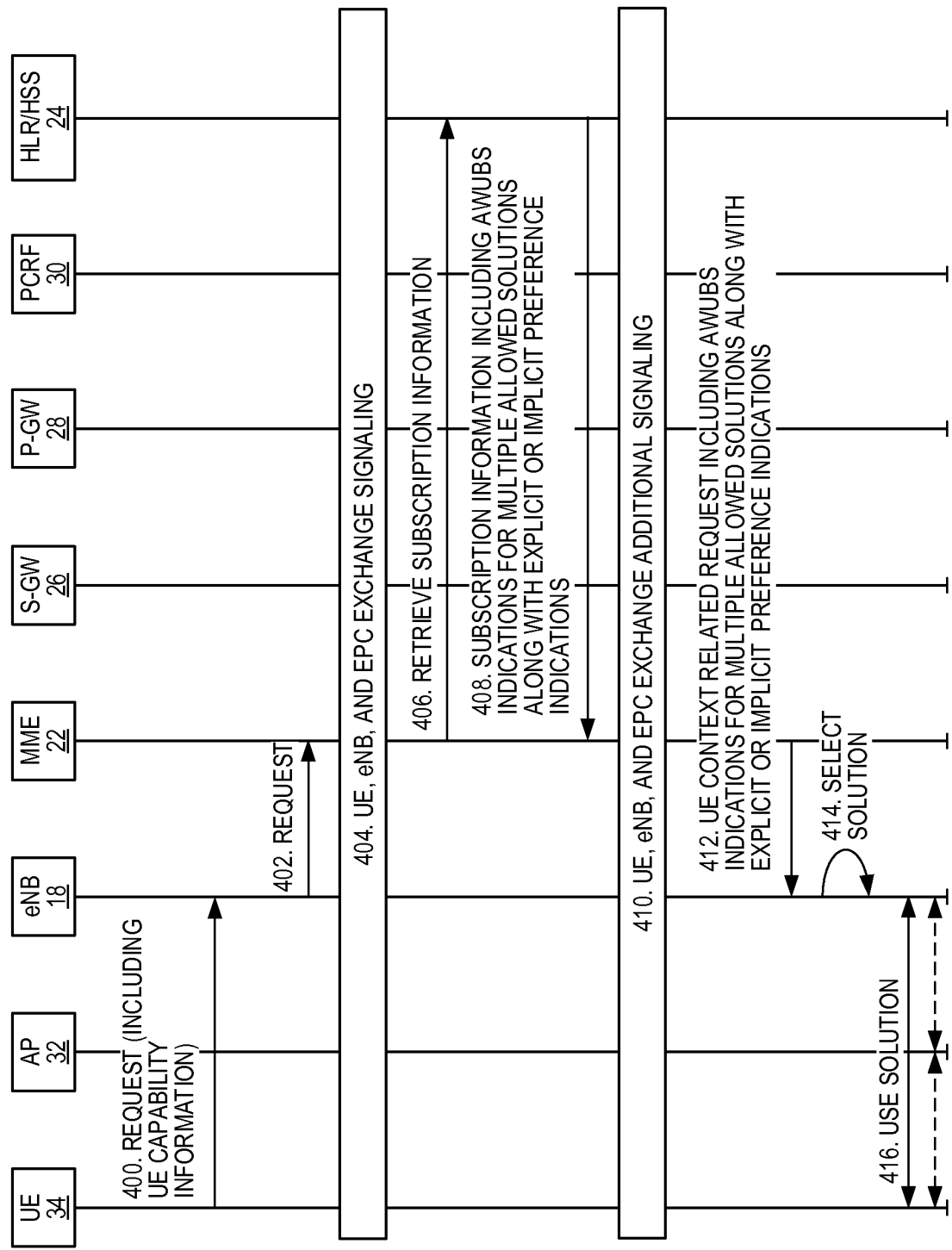

FIG. 14 illustrates the operation of the wireless system 10 according to some embodiments of the present disclosure. FIG. 14 is similar to FIG. 12 but in FIG. 14 there are multiple AWUBS indications with explicit or implicit priorities. As illustrated, the UE 34 sends a request to the eNB 18 to transition the UE 34 from the IDLE state to the CONNECTED state (step 400). The request may be, for example, an (initial) attach request, but is not limited thereto. The request may be any request made by the UE 34 to transition from the IDLE state or the CONNECTED state. In some embodiments, the request includes UE capability information, where the UE capability information may include, for example, information that explicitly or implicitly indicates which AWUBS(s) is(are) supported by the UE 34. The eNB 18 sends the request to the MME 22 within the EPC 20 (step 402). At this point, the UE 34, the eNB 18, and the EPC 20 exchange conventional signaling related to the request (step 404).

After the exchange of signaling in step 404, as a result of the request, the MME 22 retrieves subscription information for the UE 34 (or subscriber) from the HLR/HSS 24 (step 406). The HLR/HSS 24 then sends subscription information for the UE 34 to the MME 22, where the subscription information includes AWUBS indications that are indicative of multiple AWUBSs that are permitted to be used, or allowed, for the UE 34 as well as indications of the relative priorities of the indicated AWUBSs (step 408). The priorities of the indicated AWUBSs may be explicitly indicated (e.g., via assigned priority values) or implicitly indicated (e.g., via ordering in a list of AWUBS indications). After the MME 22 receives the subscription information for the UE 34, some additional signaling related to the request may be exchanged between the UE 34, the eNB 18, and the EPC 20 (step 410). The MME 22 then sends a UE context related request to the eNB 18, where the UE context related request includes the AWUBSs indications as well as indications of their relative priorities (step 412). The UE context related request may be, for example, a UE context creation request or a UE context modification request.

In some embodiments, the AWUBS indications are communicated in the S1AP initial context setup request as an SPID, a HRL, and/or a new IE. With respect to a HRL, the AWUBS indications are, in some embodiments, stored in the HRL as an enumerator, where each entry is associated with a particular priority. The priority could be implicitly or explicitly indicated. In the former case, the list is constructed in such a way so that the first entry has the highest priority, the second entry has the second highest priority, and so on. In the latter case, each entry has a particular priority associated to it (e.g., expressed in a numerical value). In some embodiments, a certain reserved priority value (e.g., the lowest or highest in the set of possible values, e.g., "0" of "255" in an 8 bit field) could indicate that the particular solution is not allowed for this subscriber/UE 34.

With respect to an SP ID, since the SPID is currently limited to 8 bits, a bitmap needs to be created for the different solutions in priority order. As an example, the last 6 bits of the SPID could be used to indicate the set of allowed solutions (i.e., AWUBS-1 through AWUBS-4, both included). In this case, a mapping is defined based on number of allowed solutions and their respective priorities. For instance, if the set of possible solutions is a set of 4 solutions {AWUBS-1, AWUBS-2, AWUBS-3, AWUBS-4}, then there are 64 different permutations of the set. The number of combinations in the set can be computed as:

$$_4P_4 + {_4P_3} + {_4P_2} + {_4P_1} = 64.$$

Then, the 64 different combinations can be expressed with the 6 bits in the SPID (using a decimal to binary mapping). In some embodiments, a table that defines mappings between the different decimal (or bit binary bit) values and the different permutations of allowed, or permitted, solutions is predefined (e.g., by standard). One example of such a table is given below in Table 3. However, this is only an example.

TABLE 3

| Decimal Value | Allowed Solutions in Order of Priority |
|---|---|
| 1 | AWUBS-1 |
| 2 | AWUBS-2 |
| 3 | AWUBS-3 |

TABLE 3-continued

| Decimal Value | Allowed Solutions in Order of Priority |
|---|---|
| 4 | AWUBS-4 |
| 5 | AWUBS-1, AWUBS-2 |
| 6 | AWUBS-1, AWUBS-3 |
| [ . . . ] | [ . . . ] |
| 61 | AWUBS-1, AWUBS-3, AWUBS-4, AWUBS-2 |
| 62 | AWUBS-1, AWUBS-3, AWUBS-2, AWUBS-4 |
| 63 | AWUBS-1, AWUBS-2, AWUBS-4, AWUBS-3 |
| 64 | AWUBS-1, AWUBS-2, AWUBS-3, AWUBS-4 |

Another option is to extend the SPID to more bits so that future solutions could be also included. Yet another option is to create a new IE, which could provide a prioritized list of the different solutions.

In some embodiments, the relative priorities of the different solutions are UE-specific. However, in other embodiments, the relative priorities of the different solutions are universal for all UEs 34. This universal prioritization of the different solutions may be defined by, e.g., the network operator. In embodiments where the relative priorities of the different solutions are universal, then the AWUBS indications (e.g., as represented by the bits of the SPID) will only indicate the permitted solutions for the UE 34 without any specific ordering. The relative priorities of the permitted solutions will then be known by the eNB 18 based on the predefined priorities of the different solutions. Thus, in some embodiments, the number of bits required in the SPID will be equal to the amount of available solutions, where each bit signifies the support of that solution for that UE 34 or not. The predefined priority order can be configured in the EUTRAN 16 using Operations and Management (O&M) functionality, or could be signaled from the EPC 20 to the EUTRAN 16 when the EPC-EUTRAN interface is established (for example, the S1-MME interface in the case of EPC and EUTRAN/LTE).

A compromise between per SPID prioritization or universal prioritization that is applicable to all UEs 34 is to define priority classes. More specifically, different prioritizations of the solutions are defined for multiple priority classes, and the SPID including the AWUBS indications is associated with one of the priority classes. For example, an operator can define 4 classes as: Class 1: AWUBS-1>AWUBS-2>AWUBS-3>AWUBS-4; Class 2: AWUBS-1>AWUBS-2>AWUBS-4>AWUBS-3; Class 3: AWUBS-1>AWUBS-2>AWUBS-4>AWUBS-3; and Class 4: AWUBS-4>AWUBS-3>AWUBS-2>AWUBS-1). These four classes can be defined by 2 bits. Thus, in some embodiments, the SPID includes a first set of bits that define the priority class (e.g., 2 bits for indicating one of 4 priority classes) and a set of bits that provide the AWUBS indications (e.g., 1 bit for each possible solution, where "1" indicates that the solution is permitted and "0" indicates that the solution is not permitted).

Neither the HRL nor a new IE are space-limited and in this case the different values can be indicated, for example, as following:

TABLE 4

| IE/Group Name | Presence | Range | IE type and reference | Semantics description |
|---|---|---|---|---|
| AWUBS with Priority List | 1 | | | |
| >AWUBS with Priority Item IEs | | 1 ... <maxnoofAWUBS> | | maxnoofAWUBS defined in standard in an extendable way |
| >>AWUBS | M | | ENUMERATED(AWUBS-1, AWUBS-2, AWUBS-3, AWUBS-4, AWUBS-5, ... ) | |
| >>>AWUBS Priority | M | | ENUMERATED(1, 2, 3, 4, 5, ... ) | |

As discussed above, the eNB 18 selects the AWUBS to be used for the UE 34 based on the AWUBS indications and the priorities of the corresponding AWUBS received from the MME 22 (step 414). For example, assume that the UE 34 supports AWUBS-1 (LTE/WLAN interworking as defined in 3GPP Rel-12), AWUBS-3 (tight LTE/WLAN aggregation as defined in 3GPP Rel-13), and AWUBS-4 (LAA as defined in 3GPP Rel-13) and the eNB 18 and the WLAN 14 support AWUBS-3 and AWUBS-4. Further, for this example, assume that the HLR/HSS 24 is configured with the following AWUBS priority list for the UE 34: {AWUBS-1, AWUBS-4, AWUBS-3}. In this example, the eNB 18 selects AWUBS-4 since AWUBS-4 is the highest priority AWUBS listed in the AWUBS priority list for the UE 34 that is also supported by the UE 34, the eNB 18, and the WLAN 14. Lastly, the eNB 18 and the UE 34 use the selected AWUBS (step 416). With respect to step 416, dashed lines between the UE 34 and the AP 32 and between the eNB 18 and the AP 32 indicate that, in some of the AWUBS solutions, the AP 32 is also impacted.

Figure 15:
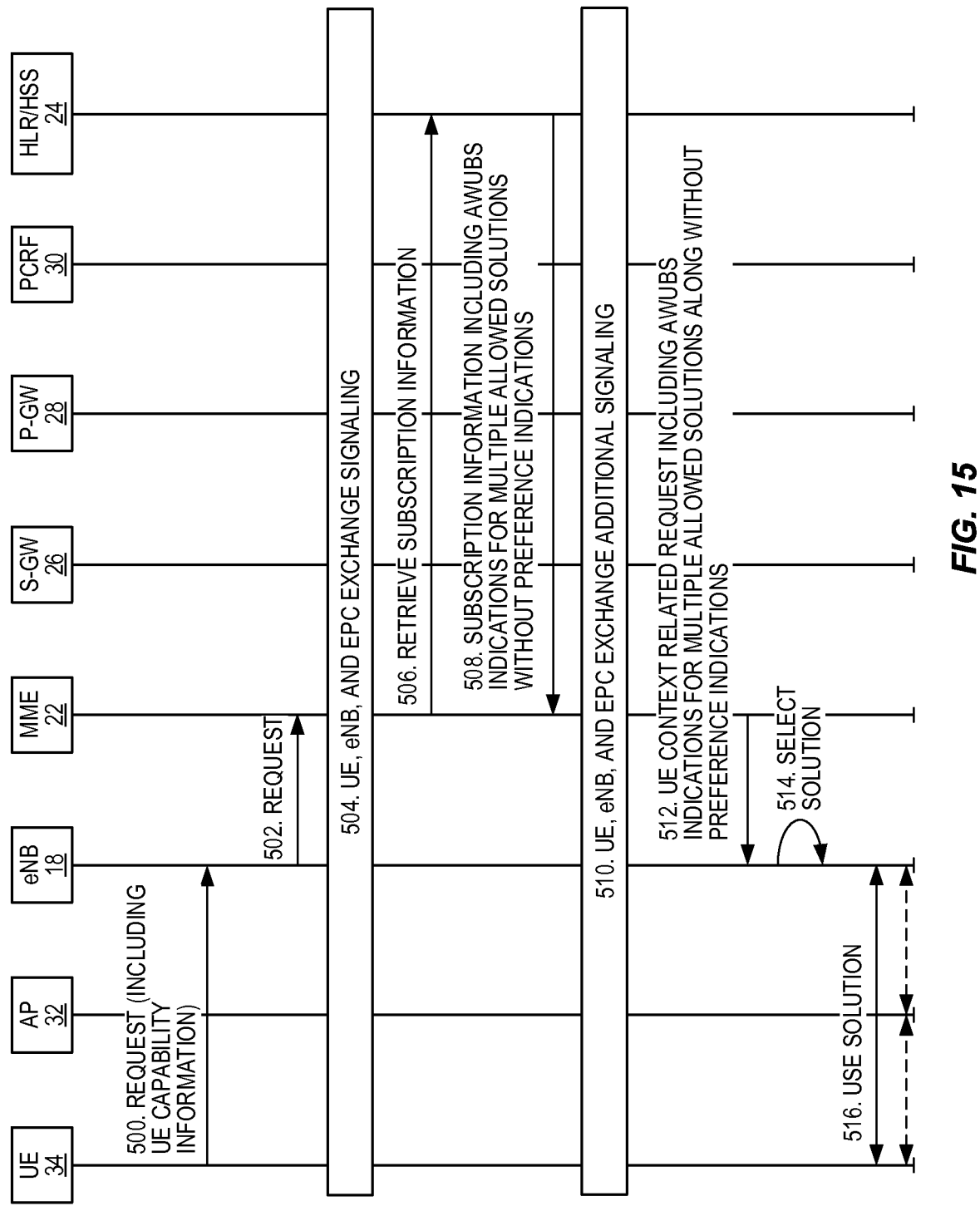

FIG. 15 illustrates the operation of the wireless system 10 according to some embodiments of the present disclosure. FIG. 15 is similar to FIG. 14 but where there are no priority indications for the permitted AWUBSs. As illustrated, the UE 34 sends a request including UE capability information to the eNB 18 (step 500). The UE capability information may include, for example, information that explicitly or implicitly indicates which AWUBS(s) is(are) supported by the UE 34. The eNB 18 sends the request to the MME 22 within the EPC 20 (step 502). At this point, the UE 32, the eNB 18, and the EPC 20 exchange conventional related signaling (step 504).

After the exchange of related signaling in step 504, the MME 22 retrieves subscription information for the UE 34 (or subscriber) from the HLR/HSS 24 (step 506). The HLR/HSS 24 then sends subscription information for the UE 34 to the MME 22, where the subscription information includes AWUBS indications that are indicative of multiple AWUBSs that are permitted to be used for the UE 34 without any indication (explicit or implicit) of priorities (step 508). After the MME 22 receives the subscription information for the UE 34, some additional related signaling may be exchanged between the UE 34, the eNB 18, and the EPC 20 (step 510). The MME 22 then sends a UE context related request to the eNB 18, where the UE context related request includes the AWUBS indications (step 512).

In some embodiments, the AWUBS indications are communicated in the S1AP initial context setup request as an SPID, a HRL, and/or a new IE. With respect to the SP ID, since the SPID is currently limited to 8 bits, each allowed solution can be allocated a particular bit. If the bit assigned to a particular solution is set to "0," then the solution is not permitted for the UE 34. Conversely, if the bit is set to "1," then the solution is permitted for the UE 34. Looking again at the example above where there are 4 possible solutions (AWUBS-1 through AWUBS-4), then 4 bits are used to indicate whether each of those solutions is permitted for the UE 34 or not. An example of the SPID mapping for 4 arbitrary bits (e.g., first 4 bits) of the SPID is shown below in Table 5.

TABLE 5

| Solution Number | Allowed/Not Allowed |
|---|---|
| Bit 1: AWUBS-1 | 1 |
| Bit 2: AWUBS-2 | 0 |
| Bit 3: AWUBS-3 | 0 |
| Bit 4: AWUBS-4 | 1 |

In some embodiments, the mapping of AWUBSs to SPID bits is predefined (e.g., standardized).

Neither the HRL nor the new IE are space-limited and this case the different values can be indicated, for example, as shown in Table 6 below.

TABLE 6

| IE/Group Name | Presence | Range | IE type and reference | Semantics description |
|---|---|---|---|---|
| AWUBS List | 1 | | | |
| >AWUBS Item IEs | | 1 ... <maxnoofAWUBS> | | maxnoofAWUBS defined in standard in an extendable way |
| >>AWUBS | M | | ENUMERATED(AWUBS-1, AWUBS-2, AWUBS-3, AWUBS-4, AWUBS-5, ...) | |

As discussed above, the eNB 18 selects the AWUBS to be used for the UE 34 based on the AWUBS indications received from the MME 22 (step 514). For example, assume that the UE 34 supports AWUBS-1 (LTE/WLAN interworking as defined in 3GPP Rel-12), AWUBS-3 (tight LTE/WLAN aggregation as defined in 3GPP Rel-13), and AWUBS-4 (LAA as defined in 3GPP Rel-13) and the eNB 18 and the WLAN 14 support AWUBS-3 and AWUBS-4. Further, for this example, assume that the HLR/HSS 24 is configured with the following AWUBS list for the UE 34: {AWUBS-1, AWUBS-4, AWUBS-3}.

In this example, the eNB 18 selects either AWUBS-3 or AWUBS-4 since both AWUBS-3 and AWUBS-4 are permitted for the UE 34 (per the AWUBS list/indications) and are supported by the UE 34, the eNB 18, and the WLAN 14. Notably, the eNB 18 may utilize additional information to select between AWUBS-3 and AWUBS-4 or may select either AWUBS-3 or AWUBS-4 using a desired selection technique (e.g., random selection). Lastly, the eNB 18 and the UE 34 use the selected AWUBS (step 516). With respect to step 516, dashed lines between the UE 34 and the AP 32 and between the eNB 18 and the AP 32 indicate that, in some of the AWUBS solutions, the AP 32 is also impacted.

Figure 16:
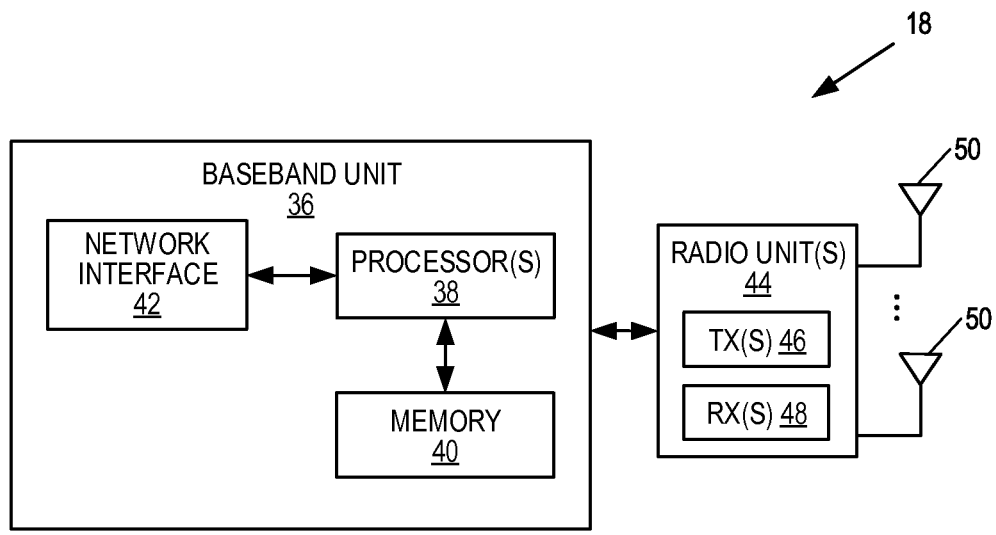
FIGS. 16 and 17 are block diagrams of a base station according to some embodiments of the present disclosure.

FIG. 16 is a block diagram of the eNB 18 according to some embodiments of the present disclosure. As illustrated, the eNB 18 includes a baseband unit 36 including one or more processors 38 (e.g., Central Processing Unit(s) (CPU(s)), Application Specific Integrated Circuit(s) (ASIC(s)), Field Programmable Gate Array(s) (FPGA(s)), or the like), memory 40, and a network interface 42 communicatively coupling the eNB 18 to, e.g., the EPC 20. The eNB 18 also includes one or more radio units 44 including transmitter(s) 46 and receiver(s) 48 connected to antennas 50. In some embodiments, the functionality of the eNB 18 described herein is implemented in software that is stored in the memory 40 and executed by the processor(s) 38.

In some embodiments, a computer program including instructions which, when executed by at least one processor, causes the at least one processor to carry out the functionality of the eNB 18 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as the memory 40).

Figure 17:
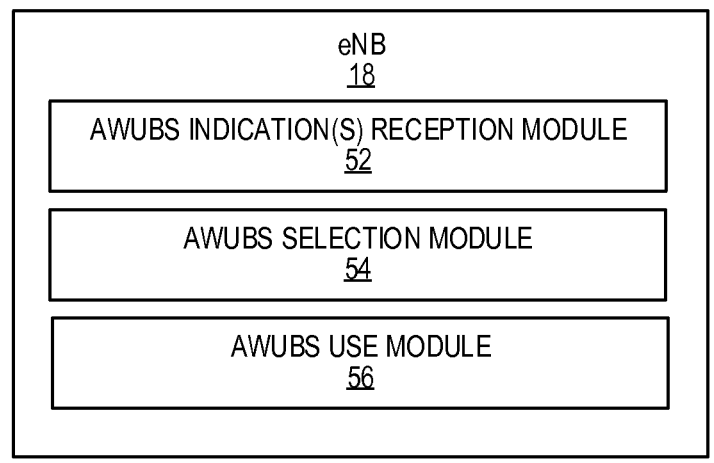

FIG. 17 is a block diagram of the eNB 18 according to some other embodiments of the present disclosure. As illustrated, the eNB 18 includes an AWUBS indication(s) reception module 52, an AWUBS selection module 54, and an AWUBS use module 56, each of which is implemented in software. The AWUBS indication(s) reception module 52 operates to obtain one or more AWUBS indications from the EPC 20 for the UE 34, as described above. The AWUBS selection module 54 operates to select an AWUBS to use for the UE 34 based on the AWUBS indication(s) received from the EPC 20, as described above. The AWUBS use module 56 operates, together with the UE 34, to use the selected (or indicated) AWUBS, as described above.

Figure 18:
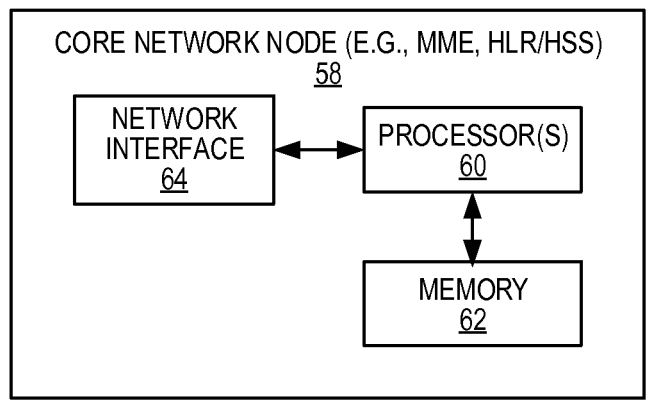
FIG. 18 is a block diagram of a network node according to some embodiments of the present disclosure.

FIG. 18 is a block diagram of a core network node 58 according to some embodiments of the present disclosure. The core network node 58 is, for example, the MME 22 or the HLR/HSS 24. As illustrated, the core network node 58 includes one or more processors 60 (e.g., CPU(s), ASIC(s), FPGA(s), or the like), memory 62, and a network interface 64 communicatively coupling the core network node 58 to, e.g., other nodes in the EPC 20 and the EUTRAN 16. In some embodiments, the functionality of the core network node 58 described herein is implemented in software that is stored in the memory 62 and executed by the processor(s) 60.

In some embodiments, a computer program including instructions which, when executed by at least one processor, causes the at least one processor to carry out the functionality of the core network node 58 (e.g., the MME 22 or the HLR/HSS 24) according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as the memory 62).

Figure 19:
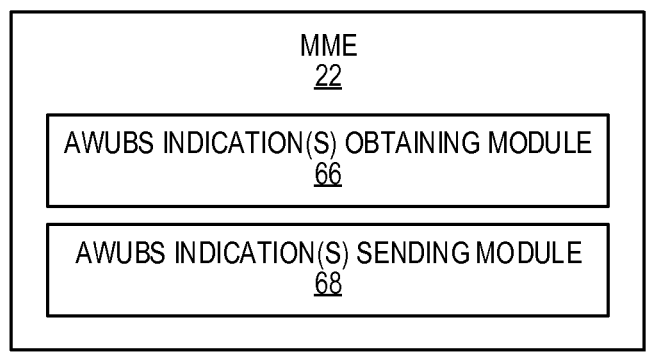
FIG. 19 is a block diagram of a Mobility Management Entity (MME) according to some embodiments of the present disclosure.

FIG. 19 illustrates the MME 22 according to some embodiments of the present disclosure. As illustrated, the MME 22 includes an AWUBS indication(s) obtaining module 66 and an AWUBS indication(s) sending module 68, each of which is implemented in software. The AWUBS indication(s) obtaining module 66 operates to obtain (via an appropriate network interface of the MME 22, not shown) subscription information containing one or more AWUBS indications for the UE 34, as described above. The AWUBS indication(s) sending module 68 operates to send (via an appropriate network interface of the MME 22, not shown) the AWUBS indication(s) for the UE 34 to the eNB 18, as described above.

Figure 20:
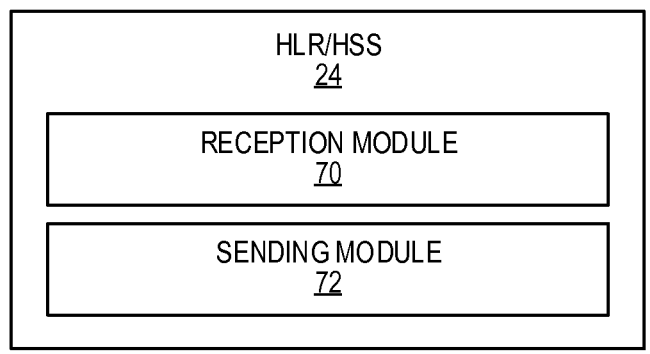
FIG. 20 is a block diagram of a Home Location Register (HLR)/Home Subscriber Server (HSS) according to some embodiments of the present disclosure.

FIG. 20 illustrates the HLR/HSS 24 according to some embodiments of the present disclosure. As illustrated, the HLR/HSS 24 includes a reception module 70 and a sending module 72, each of which is implemented in software. The reception module 70 operates to receive a request (via an appropriate network interface of the HLR/HSS 24, not shown) from the MME 22 for subscription information for the UE 34, as described above. In response, the sending module 72 sends (via an appropriate network interface of the HLR/HSS 24, not shown) subscription information containing one or more AWUBS indications for the UE 34 to the MME 22, as described above.

Embodiments described herein enable the aggregation of a given user's traffic between WLAN and 3GPP networks. Furthermore, the differentiation between different subscribers or subscribers classes can be enhanced (a higher differentiation granularity can be achieved based on the types of allowed/enabled aggregation/integration solutions).

The following acronyms are used throughout this disclosure.

3GPP Third Generation Partnership Project
AC Access Controller
ANDSF Access Network Discovery and Selection Function
AP Access Point
ASIC Application Specific Integrated Circuit
AWUBS Allowed Wireless Local Area Network/Unlicensed Band Solution
CA Carrier Aggregation
CC Component Carrier
CM Connection Manager
CPU Central Processing Unit
DU Digital Unit
Ec/No Energy per Chip/spectral Noise density
eNB Enhanced or Evolved Node B
EPC Evolved Packet Core
EUTRAN Evolved Universal Terrestrial Radio Access Network
FPGA Field Programmable Gate Array
GSM Global System for Mobile Communications
GW Gateway
HLR Home Location Register
HRL Handover Restriction List
HSS Home Subscriber Server
ID Identifier
IE Information Element
IMSI International Mobile Subscriber Identity
IP Internet Protocol
LAA License Assisted Access
LLC Logical Link Control
LTE Long Term Evolution
MAC Medium Access Control
MHz Megahertz
MME Mobility Management Entity
MPTCP MultiPath Transmission Control Protocol
O&M Operations and Management
OPI Offloading Preference Indicator
OS Operation System
PCC Primary Component Carrier
PCell Primary Serving Cell
PCRF Policy and Charging Rules Function
PDCP Packet Data Convergence Protocol
P-GW Packet Data Network Gateway
PLMN Public Land Mobile Network
RAN Radio Access Network
RAT Radio Access Technology
RCPI Received Channel Power Indicator
Rel-8 Release 8
Rel-10 Release 10
Rel-12 Release 12
Rel-13 Release 13
Rel-14 Release 14
RF Radio Frequency
RFSP Radio Access Technology/Frequency Selection Priority
RLC Radio Link Control
RRC Radio Resource Control
RSCP Received Signal Code Power
RSRP Reference Signal Received Power
RSRQ Reference Signal Received Quality
RSSI Received Signal Strength Indication
SCC Secondary Component Carrier
SCell Secondary Serving Cell
SCG Secondary Cell Group
S-GW Serving Gateway
SI Study Item
SPID Subscriber Profile Identity
TCP Transmission Control Protocol
TR Technical Report
TS Technical Specification
TSG Technical Specification Group
UE User Equipment
UMTS Universal Mobile Telecommunications System
VoIP Voice over Internet Protocol
WCDMA Wideband Code Division Multiple Access
WFA Wi-Fi Alliance
WLAN Wireless Local Area Network Those skilled in the art will recognize improvements and modifications to the embodiments of the present disclosure. All such improvements and modifications are considered within the scope of the concepts disclosed herein and the claims that follow.

What is claimed is:

1. A method of operation of a base station of a cellular communications network, the method comprising:
    obtaining one or more Allowed Wireless Local Area Network/Unlicensed Band Solution (AWUBS) indications from a core network of the cellular communications network, wherein:
        the one or more AWUBS indications are indicative of one or more AWUBSs that are allowed for a particular User Equipment (UE); and
        the one or more AWUBSs allowed for the particular UE are preferred solutions for providing interworking between a wireless local area network (WLAN) and the cellular communications network; and
    using one of the one or more AWUBSs with respect to the particular UE, wherein the core network communicates the one or more AWUBSs of the preferred solutions to the base station via an Information Element, and wherein the Information Element comprises one of a Subscriber Profile Identity (SPID) and a Handover Restriction List (HRL).

2. The method of claim 1, wherein the one or more AWUBS indications consist of a single AWUBS indication that is indicative of a single AWUBS that is allowed for the particular UE.

3. The method of claim 1, wherein the one or more AWUBS in dications comprise a plurality of AWUBS indications that are indicative of a plurality of AWUBSs that are allowed for the particular UE.

4. The method of claim 1, wherein obtaining the one or more AWUBS indications from the core network comprises obtaining a list of AWUBS indications, and wherein an ordering of the one or more AWUBS indications within the list of AWUBS indications is indicative of relative priorities of the one or more AWUBS indications.

5. The method of claim 4, wherein the relative priorities of the one or more AWUBS indications are UE specific.

6. The method of claim 4, wherein the relative priorities of the one or more AWUBS indications are same for each UE in the cellular communications network.

7. The method of claim 1, wherein obtaining the one or more AWUBS indications from the core network comprises obtaining a list of AWUBS indications without priorities.

8. The method of claim 1, wherein the one or more AWUBS indications obtained from the core network consist of a plurality of AWUBS indications, and wherein the method further comprises:
   selecting a desired AWUBS, of the one or more AWUBSs indicated by the one or more AWUBS indications, to be used with respect to the particular UE,
   wherein using the desired AWUBS comprises using the desired AWUBS of the one or more AWUBSs selected by the base station.

9. The method of claim 8, wherein selecting the desired AWUBS of the one or more AWUBSs comprises selecting the desired AWUBS of the one or more AWUBSs based on at least one of a group consisting of: capabilities of the particular UE, knowledge of one or more AWUBSs supported by the base station, and knowledge of one or more AWUBSs supported by an associated WLAN Access Point (AP).

10. The method of claim 8, wherein the one or more AWUBS indications comprise a plurality of AWUBS indications indicative of a plurality of AWUBSs that are allowed for the particular UE, and wherein:
   obtaining the one or more AWUBS indications from the core network comprises obtaining the plurality of AWUBS indications and indications of relative priorities of the plurality of AWUBSs indicated by the plurality of AWUBS indications, from the core network; and
   selecting the desired AWUBS of the one or more AWUBSs comprises selecting the desired AWUBS of the one or more AWUBSs based on the relative priorities of the plurality of AWUBSs indicated by the plurality of AWUBS indications and at least one of a group consisting of: capabilities of the particular UE, knowledge of one or more AWUBSs supported by the base station, and knowledge of one or more AWUBSs supported by an associated WLAN Access Point (AP).

11. The method of claim 1, wherein obtaining the one or more AWUBS indications from the core network comprises obtaining the one or more AWUBS indications from the core network when a UE context is created for the particular UE in a radio access network of the cellular communications network.

12. The method of claim 1, wherein obtaining the one or more AWUBS indications from the core network comprises obtaining the one or more AWUBS indications from the core network when a UE context is modified for the particular UE in a radio access network of the cellular communications network.

13. The method of claim 1, further comprising:
   receiving a request from the particular UE to transition from an idle state to a connected state;
   sending the request to the core network; and
   in response to sending the request to the core network, receiving, from the core network, the one or more AWUBS indications.

14. The method of claim 1, further comprising:
   receiving a request from the particular UE to transition from an idle state to a connected state;
   sending the request to the core network; and
   in response to sending the request to the core network, receiving, from the core network, a UE context related request comprising the one or more AWUBS indications.

15. The method of claim 1, wherein obtaining the one or more AWUBS indications from the core network comprises obtaining the one or more AWUBS indications from the core network using a SPID information element associated with the particular UE.

16. The method of claim 1, wherein obtaining the one or more AWUBS indications from the core network comprises obtaining the one or more AWUBS indications from the core network using an HRL information element associated with the particular UE.

17. The method of claim 1, wherein obtaining the one or more AWUBS indications from the core network comprises obtaining the one or more AWUBS indications from the core network using the Information Element associated with the particular UE.

18. The method of claim 1, wherein using the one of the one or more AWUBSs with respect to the particular UE comprises sending one or more parameters to the particular UE.

19. The method of claim 1, wherein using the one of the one or more AWUBSs with respect to the particular UE comprises providing one of a group consisting of: Packet Data Convergence Protocol (PDCP) level cellular network and WLAN integration, Radio Link Control (RLC) level Third Generation Partnership Project (3GPP) and WLAN integration, and Medium Access Control (MAC) level 3GPP and WLAN integration with respect to the particular UE.

20. The method of claim 1, wherein using the one of the one or more AWUBSs with respect to the particular UE comprises configuring a secondary component carrier for the particular UE in an unlicensed frequency spectrum according to a Licensed Assisted Access (LAA) scheme.

21. A base station of a cellular communications network, the base station comprising:
   one or more radio units;
   a network interface communicatively coupling the base station to a core network of the cellular communications network;
   one or more processors; and
   memory containing instructions executable by the one or more processors, whereby the base station is operable to:
      obtain one or more Allowed Wireless Local Area Network/Unlicensed Band Solution (AWUBS) indications from the core network of the cellular communications network, wherein:
         the one or more AWUBS indications are indicative of one or more AWUBSs that are allowed for a particular User Equipment (UE); and
         the one or more AWUBSs allowed for the particular UE are preferred solutions for providing interworking between a wireless local area network (WLAN) and the cellular communications network; and
      use one of the one or more AWUBSs with respect to the particular UE, wherein the core network communicates the one or more AWUBSs of the preferred solutions to the base station via an Information Element, and wherein the Information Element comprises one of a Subscriber Profile Identity (SPID) and a Handover Restriction List (HRL).

* * * * *